(12) United States Patent
Yoda et al.

(10) Patent No.: US 7,100,267 B2
(45) Date of Patent: Sep. 5, 2006

(54) MAGNETIC HEAD, METHOD FOR PRODUCING SAME, AND MAGNETIC RECORDING AND/OR REPRODUCING SYSTEM

(75) Inventors: Hiroaki Yoda, Kawasaki (JP); Yuichi Osawa, Yokohama (JP); Tomomi Funayama, Fujisawa (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 418 days.

(21) Appl. No.: 10/635,508

(22) Filed: Aug. 7, 2003

(65) Prior Publication Data

US 2004/0027883 A1    Feb. 12, 2004

Related U.S. Application Data

(62) Division of application No. 09/810,187, filed on Mar. 19, 2001, now Pat. No. 6,665,143.

(30) Foreign Application Priority Data

Mar. 30, 2000    (JP)    ............... 2000-095082

(51) Int. Cl.
*G11B 5/127* (2006.01)
*G11B 5/187* (2006.01)

(52) U.S. Cl. ............... 29/603.14; 29/603.11; 29/603.13; 29/603.15; 29/603.2; 29/603.27; 427/97.2; 427/97.7; 427/127; 427/128; 204/192.1

(58) Field of Classification Search ............. 29/603.07, 29/603.11, 603.13, 603.14, 603.15, 603.2, 29/603.27; 204/192.1; 427/97.2, 97.7, 127, 427/128; 360/125, 119–122, 321, 110

See application file for complete search history.

(56) References Cited

U.S. PATENT DOCUMENTS

| | | | |
|---|---|---|---|
| 3,313,889 A | 4/1967 | Machinski | |
| 4,731,157 A | 3/1988 | Lazzari | |
| 4,837,924 A | 6/1989 | Lazzari | |
| 4,984,118 A | 1/1991 | Springer | |
| 5,123,156 A | 6/1992 | Meunier et al. | |
| 5,274,521 A | 12/1993 | Miyauchi et al. | |
| 5,486,967 A | 1/1996 | Tanaka et al. | |
| 5,703,740 A | 12/1997 | Cohen et al. | |
| 5,717,630 A | 2/1998 | Koshikawa et al. | |
| 5,742,457 A | 4/1998 | Simmons et al. | |
| 5,761,789 A * | 6/1998 | Honma et al. | ........... 29/603.15 |
| 5,793,577 A | 8/1998 | Katz et al. | |
| 5,872,693 A | 2/1999 | Yoda et al. | |

(Continued)

FOREIGN PATENT DOCUMENTS

JP    50-66219    6/1975

(Continued)

OTHER PUBLICATIONS

Patent Abstracts of Japan, JP 01-027008, Jan. 30, 1989.

(Continued)

*Primary Examiner*—A. Dexter Tugbang
(74) *Attorney, Agent, or Firm*—Oblon, Spivak, McClelland, Maier & Neustadt, P.C.

(57) ABSTRACT

A method for producing a magnetic head, including the steps of forming a magnetic body on a substrate, the magnetic body including a principal plane facing the substrate and a rear plane opposite to the principal plane; applying a beam to the rear plane of the magnetic body and forming a portion defining a hole extending from the rear plane to the principal plane; forming a magnetic gap in the hole; and separating the magnetic body and the magnetic gap from the substrate and forming medium facing surface substantially coplanar with the principal plane.

2 Claims, 21 Drawing Sheets

U.S. PATENT DOCUMENTS

| | | |
|---|---|---|
| 5,920,449 A | 7/1999 | Tagawa |
| 5,995,343 A | 11/1999 | Imamura |
| 6,436,560 B1 | 8/2002 | Kato et al. |
| 2002/0101328 A1 | 8/2002 | Hashimoto et al. |

FOREIGN PATENT DOCUMENTS

| | | | | |
|---|---|---|---|---|
| JP | 50-129005 | | 10/1975 | |
| JP | 56-83823 | | 7/1981 | |
| JP | 1-245419 | * | 9/1989 | ............ 427/128 |
| JP | 3-59812 | | 3/1991 | |
| JP | 3-232108 | | 10/1991 | |
| JP | 8-235526 | | 9/1996 | |
| JP | 10-241117 | | 9/1998 | |
| JP | 2001/148107 A | | 5/2001 | |

OTHER PUBLICATIONS

Patent Abstracts of Japan, JP 63-138513, Jun. 10, 1988.
Patent Abstracts of Japan, JP 62-195709, Aug. 28, 1987.
Patent Abstracts of Japan, JP 04-134609, May 8, 1992.
Patent Abstracts of Japan, JP 02-116007, Apr. 27, 2004.
Patent Abstracts of Japan, JP 56-082813, Jul. 8, 1981.
Patent Abstracts of Japan, JP 56-145517, Nov. 12, 1981.
Patent Abstracts of Japan, JP-06-004829, Jan. 14, 1994.

* cited by examiner

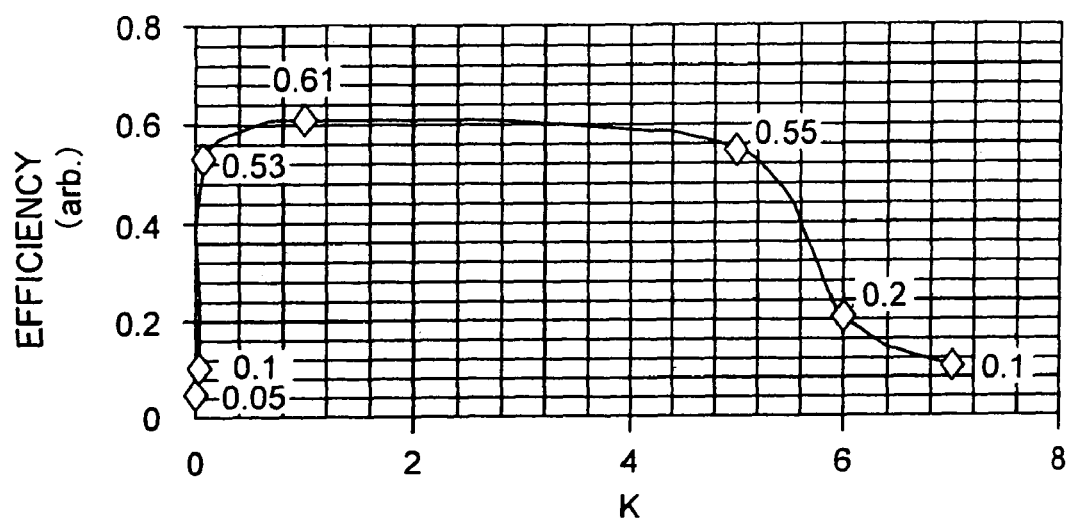
F I G. 3
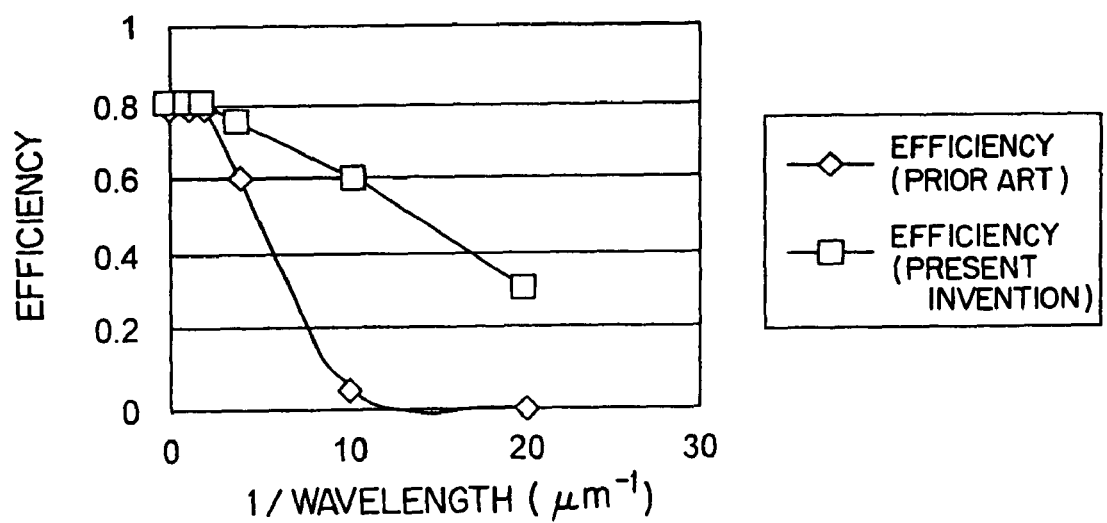
F I G. 4

MAGNETIC HEAD, METHOD FOR PRODUCING SAME, AND MAGNETIC RECORDING AND/OR REPRODUCING SYSTEM

CROSS REFERENCE TO RELATED APPLICATION

This application claims benefit of priority under 35USC § 119 to Japanese Patent Application No. 2000-95082, filed on Mar. 30, 2000, the contents of which are incorporated by reference herein.

BACKGROUND OF THE INVENTION

1. Field of the Invention

The present invention relates generally to a magnetic head and a method for producing the same, and magnetic recording and/or reproducing system.

2. Description of Related Art

It is generally known that the efficiency of a magnetic head is rapidly improved as the magnetic path length of a magnetic circuit decreases. For example, as shown in FIG. 18A, the efficiency is rapidly improved as the magnetic path length decreases to 2 µm (=2000 nm) or less. As shown in FIG. 18B, the magnetic path length means the length of a magnetic circuit passing through a magnetic substance portion 52a, magnetic substance portion 53a, magnetoresistance effect element (e.g., GMR(giant magnetoresistance effect) element), magnetic substance portion 53b and magnetic substance portion 52b of a magnetic head.

The construction of a first example of a conventional magnetic head is shown in FIG. 19. This conventional magnetic head comprises a pair of magnetic substance portions 51a and 51b which are constructed so as to form two different gaps G1 and G2, and a magnetoresistance effect element 56 which is provided in the gap G2. The construction of a second example of a conventional magnetic head is shown in FIG. 20. The magnetic head in this second example comprises a pair of magnetic substance portions 52a and 52b which are arranged so as to be spaced from each other by a gap G1, a pair of magnetic substance portions 53a and 53b which are arranged so as to be spaced from each other by a gap G2 which is greater than the gap G1, and a magnetoresistance effect element 56 which is formed as a bridge between the magnetic substance portions 53a and 53b. In the first and second examples, the gap G1 is formed so as to be more close to a medium facing surface than the gap G2.

The magnetic substance portions 51a and 51b of the magnetic head in the first example are formed by lithography at separate steps, respectively, and the pair of the magnetic substance portions 52a and 52b and the pair of magnetic substance portions 53a and 53b of the magnetic head in the second example are formed by lithography at separate steps, respectively.

Therefore, there is a limit to the formation of a fine magnetic path due to an alignment error and the resolution of a photolithography system. For example, even if an advanced stepper is used, there is an alignment error due to the mechanical alignment precision (50 nm) of the stepper and the deformation of the substrate, so that an error of 400 nm is caused. In order to decrease the producing costs, an inexpensive excimer laser is often used for lithography. When the excimer laser is used, the resolution is about 200 nm. As can be seen from FIG. 21, the alignment error expresses a shift from the center of the gap G1, so that the whole alignment error is 800 nm (=400 nm×2). For that reason, it is not possible to form a magnetic head having a magnetic path length which is equal to or less than a value (2000 nm) obtained by doubling a value (1000 nm) obtained by adding the resolution of 200 nm to the alignment error of 800 nm.

As shown in FIG. 21, in order to form a small magnetic path having a high efficiency, it is required to decrease both of the length G2 of a magnetic gap on the opposite side to a medium facing surface 58 and the height H from the medium facing surface 58 to a magnetoresistance effect element 58. In order to increase the line resolution, it is also required to decrease the length G1 of a magnetic gap on the side of the medium facing surface (about 50 nm).

However, in conventional magnetic head structures and conventional methods for producing the same, these requirements can not be satisfied.

Ironically, as can be seen from FIG. 18A, the efficiency of a magnetic head is rapidly improved when the magnetic path length is about 2000 nm or less which can not be formed in the prior art. Even if a small magnetic path is formed by a conventional magnetic head structure, the efficiency is rapidly lowered in the reproduction of a shorter wavelength signal (0.1 µm or less) required in recent years although the reason for this is not clear, so that it can not be used as a high-density recording head. This is the same during a recording operation, not only during a reproducing operation. In conventional recording heads, the efficiency is greatly lowered in the recording at a shorter wavelength although the reason for this is not clear, so that it is not possible to record on low noise medium for a high density, which exceeds 50 Gbpsi (Giga bit per square inch), using current which can be supplied by a recording IC(Integrated Circuit).

It was found that the lowering of the recording/reproducing efficiency in a shorter wavelength region was remarkable when the length of a magnetic path approaches the order of the thickness (100 nm) of a magnetic domain wall of a magnetically soft substance.

As described above, in all of the conventional head structures, a thin-film is patterned by lithography to form a magnetic circuit. Therefore, even if a small magnetic circuit is intended to be formed, there is a limit to the increase of the efficiency of the head. Moreover, even if a desired head can be available with low yields, there is a problem in that the recording/reproducing efficiency at a shorter wavelength is greatly lowered so that it is not possible to record/reproduce at a high density.

SUMMARY OF THE INVENTION

It is therefore an object of the present invention to eliminate the aforementioned problems and to provide a magnetic head capable of recording or reproducing with a high efficiency even in the case of a shorter magnetic path length and a shorter wavelength signal, a method for producing the same, and a magnetic recording and/or reproducing system using the same.

In order to decrease the magnetic path length as short as possible, a magnetic head shown in, e.g., FIG. 17, is considered. That is, a pair of magnetic substance portions 54a and 54b are arranged so as to spaced from each other by a predetermined gap G, and a magnetoresistance effect element 56 is provided so as to construct a bridge between the magnetic substance portions 54a and 54b.

This magnetic head can not be used as a high-density magnetic head since it has a low reproducing efficiency or a bad reproducing resolution although it is suited to decrease the magnetic path length. That is, when the magnetic gap length G is small, most of magnetic fluxes from the medium flow into the magnetic gap, and only part of magnetic fluxes flow into the magnetoresistance effect element, so that it is not possible to obtain a great output. On the other hand, when the magnetic gap length is great, the line resolution is extremely bad, so that the magnetic head is not worth being used as a tip magnetic head for high density.

Therefore, in order to accomplish the aforementioned and other objects, the inventors have invented a magnetic head having the following construction and a method for producing the same.

According to a first aspect of the present invention, a magnetic head comprises: a pair of magnetic bodies comprising respective first and second medium facing surfaces, respective first and second rear surfaces opposite to the medium facing surfaces, and respective inner side surfaces, the inner side surfaces facing each other; and a magnetic gap disposed between the inner side surfaces and comprising third medium facing surface coplanar with the first and the second medium facing surfaces and third rear surface coplanar with the first and second rear surfaces; one of the inner side surfaces satisfying relationships of $x = G1/2$ with respect to $0 \leq y \leq TH$, and $0.1 \cdot \tan\{2(x-G1/2)\} + TH \leq y \leq 5 \cdot \tan(2(x-G1/2)) + TH$ with respect to $TH \leq y$ where x represents X-coordinate of the one of the inner side surfaces and y represents Y-coordinate of the one of the inner side surfaces, the X-axis extends from a center of the third medium facing surface toward a center of the first or the second medium facing surface, the Y-axis extends from the center of the third medium facing surface toward the third rear surface, the Y-axis is substantially perpendicular to the X-axis, and G1 and TH respectively represent constants.

It is preferred that y continuously varies from a point, $y=TH$, to the first or second rear surface as x continuously increases from a point, $x=G1/2$.

The pair of magnetic bodies may comprise protruding portions of magnetically soft substance on the first or second medium facing surfaces on both sides of the magnetic gap.

The pair of magnetic bodies are magnetic yokes, and the magnetic head may further comprise a magnetoresistance effect element arranged on the first and second rear surfaces and disposed over the magnetic gap.

The pair of magnetic bodies are magnetic cores, and the magnetic head may further comprise: a rear yoke of magnetically soft substance provided on the first and second rear surfaces and disposed over the magnetic gap, and a recording coil formed in the magnetic gap.

According to a second aspect of the present invention, a magnetic recording head comprises: a pair of magnetic bodies spaced apart with a magnetic gap therebetween and comprising respective medium facing surfaces and respective rear surfaces opposite to the medium facing surfaces, one of the pair of magnetic bodies comprising a protruding portion, the protruding portion being tapered off toward the medium facing surface; a recording coil provided in the magnetic gap; and a rear magnetic body of magnetically soft substance disposed on the rear surfaces and disposed over the magnetic gap.

According to a third aspect of the present invention, a magnetic reproducing head comprises: a pair of magnetic bodies spaced apart with a magnetic gap therebetween and comprising respective medium facing surfaces and respective rear surfaces opposite to the medium facing surfaces, one of the pair of magnetic bodies comprising a protruding portion, the protruding portion being tapered off toward the medium facing surface; and a magnetoresistance effect element disposed on the rear surfaces and disposed over the magnetic gap.

According to a fourth aspect of the present invention, there is provided a method for producing a magnetic head, comprising: forming a magnetic body on a substrate, the magnetic body comprising a principal plane facing the substrate and a rear plane opposite to the principal plane; applying beam to the rear plane of the magnetic body and forming a portion defining a hole extending from the rear plane to the principal plane; forming a magnetic gap in the hole; and separating the magnetic body and the magnetic gap from the substrate and forming medium facing surface substantially coplanar with the principal plane.

The beam is preferably focused ion beam.

According to a fifth aspect of the present invention, there is a method for producing a magnetic head comprising: forming an insulating film on a substrate; applying focused ion beam to the insulating film in a direction toward the substrate, and forming a portion defining first and second trenches in the insulating film; filling magnetic substance in the first and second trench to form a pair of magnetic bodies; forming a recording coil in the insulating film between the pair of magnetic bodies; and forming a second magnetic body on the pair of magnetic bodies and the recording coil.

According to the magnetic head with the above described construction according to the first aspect of the present invention, the magnetic gap is formed so as to meet the above described relational expressions, so that it is possible to enhance the reproducing efficiency even in the case of a shorter magnetic path length and a shorter wavelength signal. In addition, it is possible to decrease the length of the magnetic gap on the side of the recording medium, so that it is possible to enhance the resolution.

According to the magnetic recording head with the above described construction according to the second aspect of the present invention, it is possible to decrease the height of one of the magnetic bodies having the protruding portion, i.e., the distance between the surface of the protruding portion facing the recording medium and the rear surfaces, so that it is possible to decrease the magnetic path length and to greatly improve the recording efficiency. In addition, the protruding portion has the shape tapered off toward the medium facing surface, it is possible to further improve the efficiency when shorter wavelength signals are recorded.

According to the magnetic reproducing head with the above described construction according to the third aspect of the present invention, it is possible to decrease the height of one of the magnetic bodies having the protruding portion, i.e., the distance between the surface of the protruding portion facing the recording medium and the rear surfaces, so that it is possible to decrease the magnetic path length and to greatly improve the recording efficiency. In addition, the protruding portion has the shape tapered off toward the medium facing surface, it is possible to further improve the efficiency when shorter wavelength signals are recorded.

According to the magnetic head producing method with the above described construction according to the fourth aspect of the present invention, the beam is applied to the rear plane of the magnetic body and the hole is formed to extend from the rear plane to the principal plane and the magnetic gap is formed in the hole. Thus, it is possible to form a desired magnetic gap, the length of which is small on the side of the principal plane and continuously varies toward the rear plane, and it is possible to decrease the magnetic path length as small as possible, so that it is possible to obtain a magnetic head capable of efficiently carrying out a reproducing operation even in the case of a shorter wavelength signal.

According to the magnetic head producing method with the above described construction according to the fifth aspect of the present invention, the focused ion beam is used for forming the first and second trenches in the insulating film, and the first and second trenches are filled with the magnetic substance to form the pair of magnetic bodies. Thus, it is possible to obtain the pair of magnetic bodies having desired shapes, and it is possible to decrease the magnetic path length, so that it is possible to obtain a magnetic head having a greatly improved efficiency when shorter wavelength signals are recorded.

BRIEF DESCRIPTION OF THE DRAWINGS

The present invention will be understood more fully from the detailed description given herebelow and from the accompanying drawings of the preferred embodiments of the invention. However, the drawings are not intended to imply limitation of the invention to a specific embodiment, but are for explanation and understanding only.

In the drawings:

FIG. 3 is a graph showing the relationship between a parameter for determining the shape of the magnetic gap of the magnetic head in the first preferred embodiment, and a reproducing/recording efficiency;

FIG. 4 is a graph showing the relationship between the high-frequency characteristics of the magnetic head in the first preferred embodiment and a conventional magnetic head;

DESCRIPTION OF THE PREFERRED EMBODIMENTS

Referring now to the accompanying drawings, the preferred embodiments of the present invention will be described below.

FIRST PREFERRED EMBODIMENT

Figure 1:
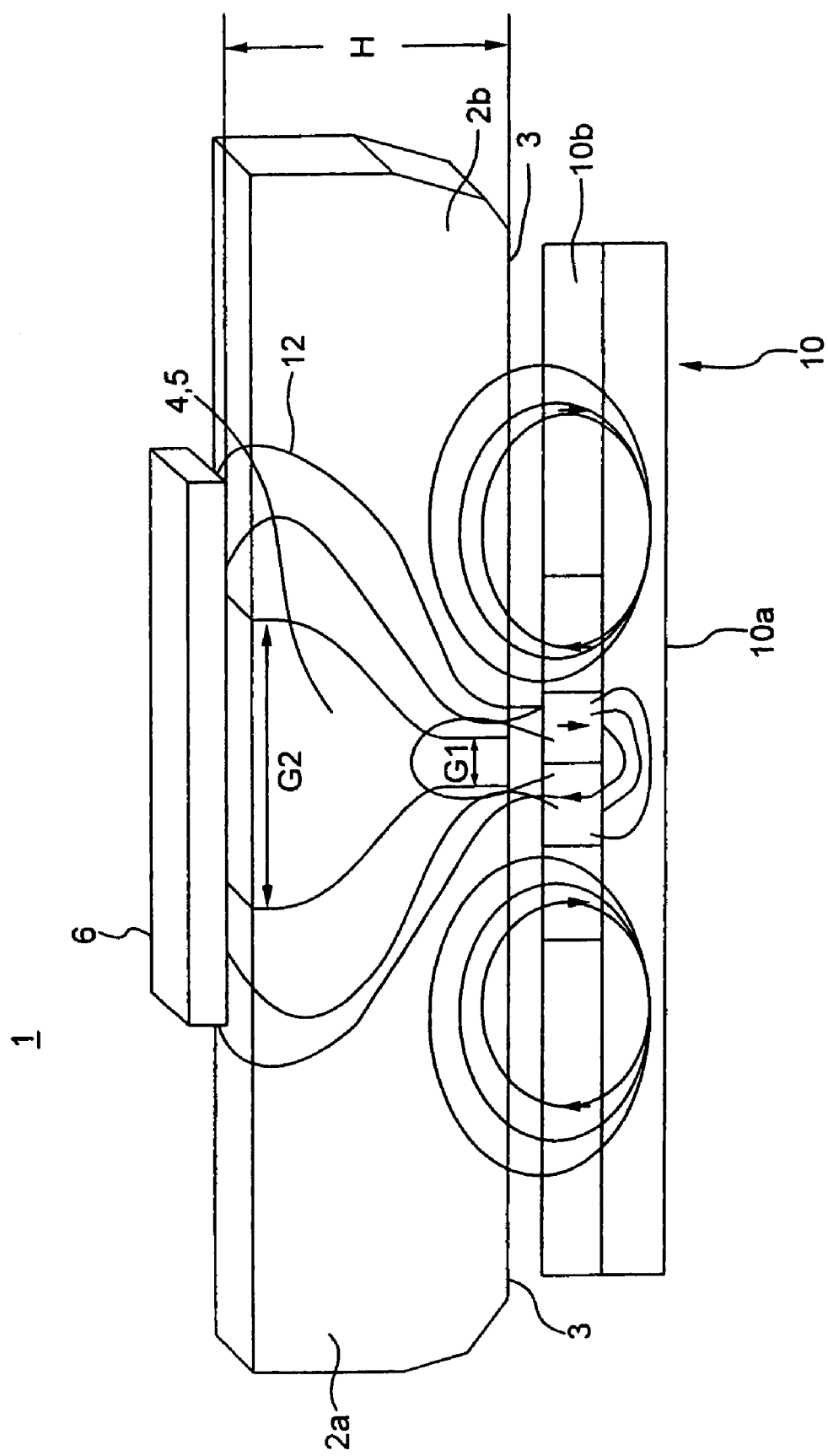
FIG. 1 is a schematic diagram showing the construction of the first preferred embodiment of a magnetic head according to the present invention.

The construction of the first preferred embodiment of a magnetic head according to the present invention is shown in FIG. 1. The magnetic head 1 in the first preferred embodiment comprises a pair of magnetic substance portions 2a and 2b of a magnetically soft substance having a thickness of, e.g., about 200 nm, a recording coil 5, and a magnetoresistance effect element 6, e.g., 300 nm square. The principal plane 3 of the pair of magnetic substance portions 2a and 2b is arranged so as to be parallel to a recording medium 10. That is, the principal plane 3 serves as a medium facing surface. Furthermore, the recording medium 10 is a vertical recording medium to be formed so that a medium layer 10b on which signals are recorded is formed on a magnetically soft substance film 10a.

The pair of magnetic substance portions 2a and 2b are arranged so as to be spaced from each other by a magnetic gap 4. This magnetic gap 4 is constructed so as to have a relatively small length G1 of, e.g., about 50, on the side of the medium facing surface 3 and a relatively large length G2 of, e.g., about 200 nm, on the opposite side to the medium facing surface 3, so that the length of the magnetic gap continuously varies from the side of the medium facing surface 3 to the opposite side thereto. In the magnetic gap 4, the recording coil 5 is embedded.

The magnetoresistance effect element 6 is arranged on the opposite surface to the medium facing surface of a pair of magnetic yokes so as to straddle the magnetic gap G2. In FIG. 1, reference number 12 denotes magnetic fluxes which are generated from the magnetization of the recording medium 10. In addition, electrodes and biasing magnetic films are provided on the right and left sides or the upside and downside of the magnetoresistance effect element 6 although they are not shown in FIG. 1.

Figure 2:
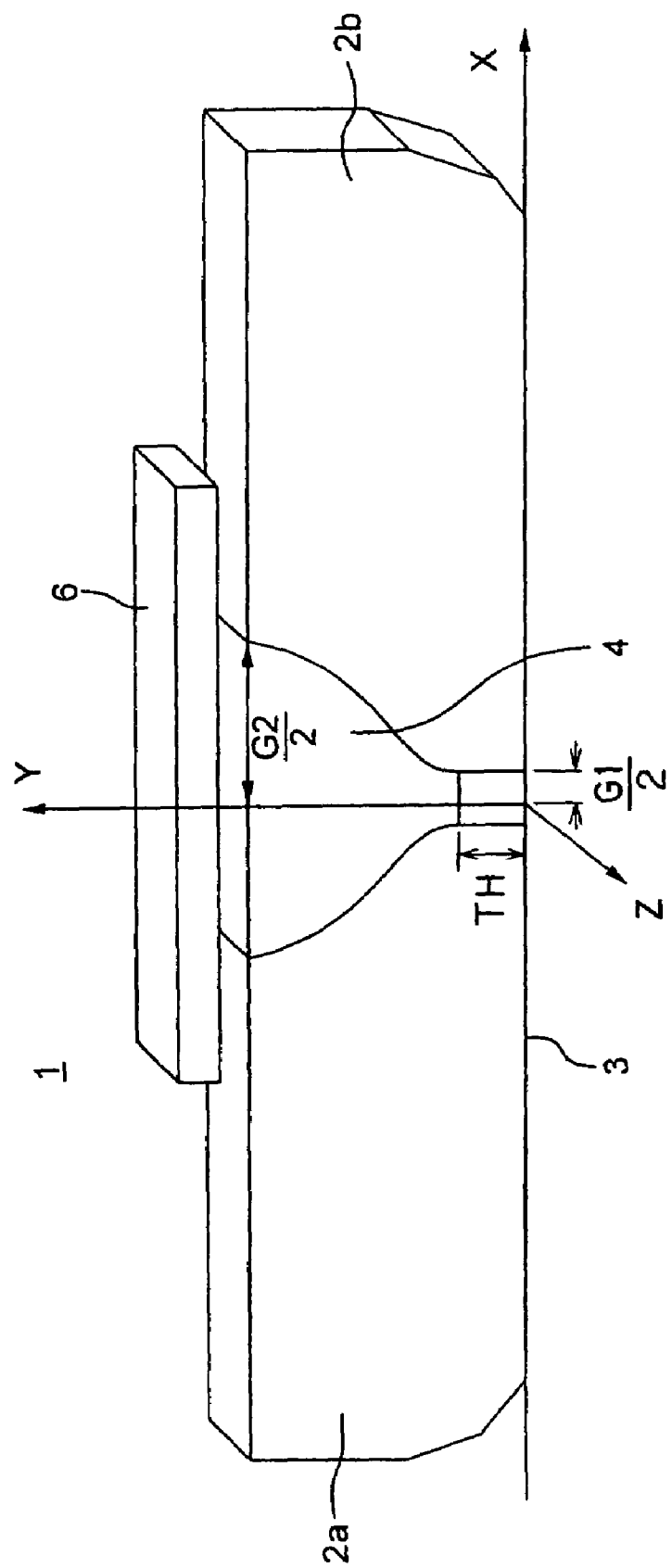
FIG. 2 is a schematic diagram for explaining the shape of a magnetic gap of the magnetic head in the first preferred embodiment.

In the magnetic head 1 according to this preferred embodiment, the distance H between the medium facing surface 3 and magnetoresistance effect element 6 of the magnetic head 3 is a small distance of about 200 nm, and the length of the magnetic path of the magnetic head 1 is a small length of about 600 nm. For that reason, if the gap between the recording medium 10 and the medium facing surface 3 of the magnetic head 1 is about 200 nm, 20% or more of the magnetic fluxes 12, which are generated from the magnetization of the medium 10 below the magnetic gap G1 on the side of the medium facing surface 3, enter the magnetoresistance effect element 6 in accordance with calculation. Thus, it is possible to obtain a very large output. Moreover, it was found from an experiment that it is important that the length of the magnetic gap gradually continuously increases from the medium facing surface in the case of the reproduction of high-frequency signals. Particularly as shown in FIG. 2, assuming that the center of the magnetic gap on the medium facing surface is the origin, the track direction of the medium 10 being X-axis, the track width direction being Z-axis, and the inward direction of the magnetic head 1 being Y-axis, and a predetermined value being TH, then, it was found that the efficiency was greatly improved if the shape of the magnetic gap 4 meets the following expressions.

With respect to $0 \leq y \leq TH$, $x = G1/2$

With respect to $TH \leq y$, $0.1 \cdot \tan(2 \cdot (x-G1/2)) + TH \leq y \leq 5 \cdot \tan(2 \cdot (x-G1/2)) + TH$ Referring to FIGS. 3 and 4, this will be described below. When $x = G1/2$ with respect to $o \leq y \leq TH$, and $y = k \cdot \tan(2 \cdot (x-G1/2)) + TH$ with respect to $TH \leq y$, and when the shape of the magnetic gap is changed using k as a parameter, the results of calculated efficiencies are shown in FIG. 3. As can be seen from FIG. 3, when the value of k is in the range of $0.1 \leq k \leq 5$, the efficiency is substantially the maximum value. Thus, if the shape of the magnetic gap 4 meets the above described expressions, a high efficiency can be obtained.

Figure 20:
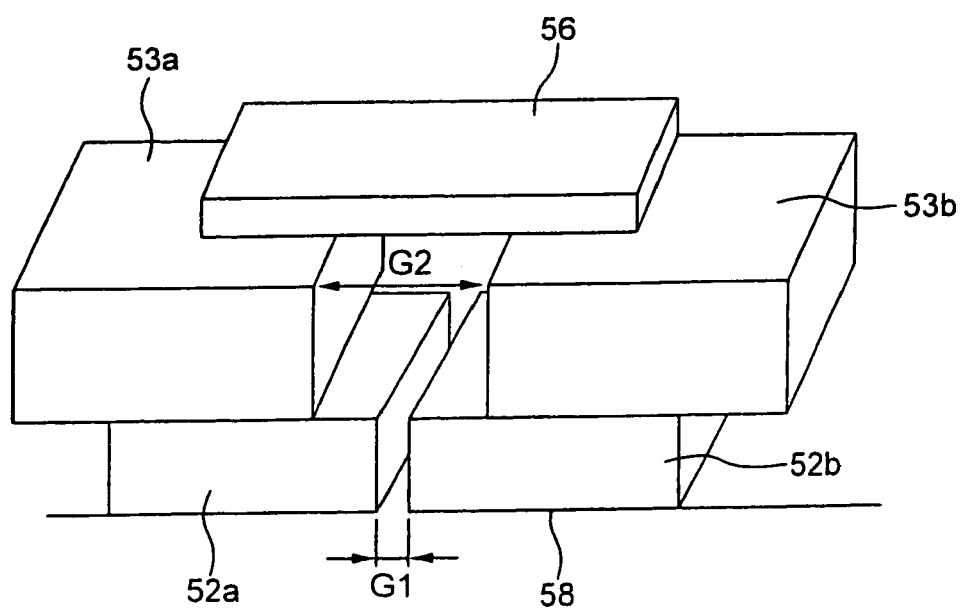
FIG. 20 is a schematic diagram showing the construction of another example of a conventional magnetic head.
Figure 21:
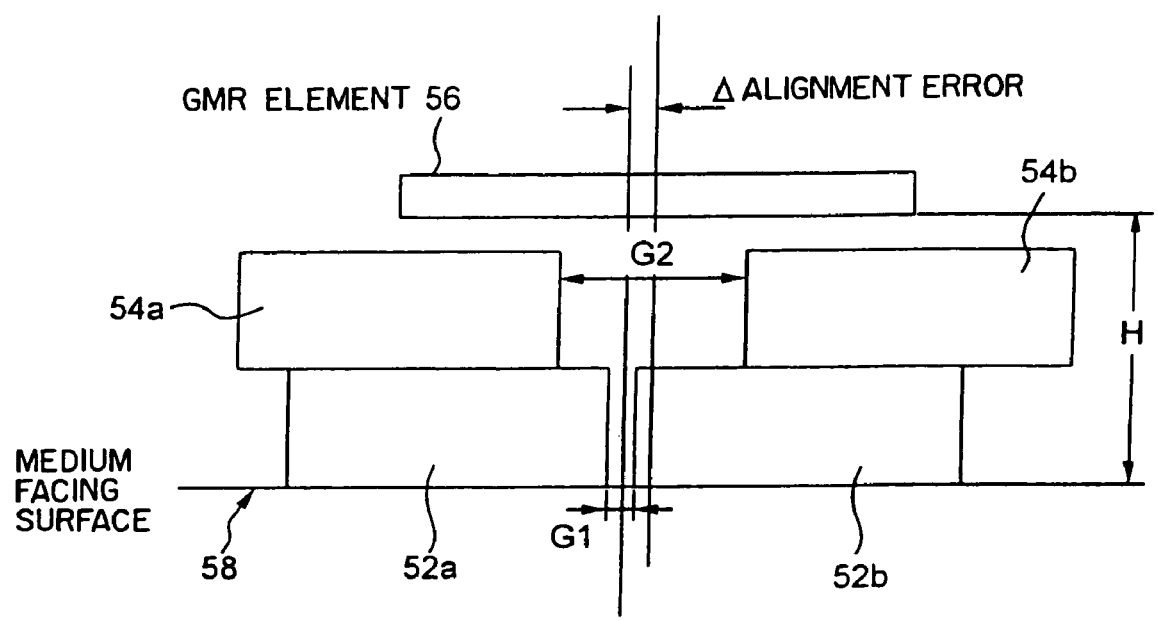
FIG. 21 is a schematic diagram for explaining problems in the conventional magnetic head.

FIG. 4 shows the results of calculated frequency characteristics of efficiencies of the conventional magnetic head shown in FIG. 20, which has the magnetic gap substantially having the same size as that of the magnetic head in this preferred embodiment. As can be seen from FIG. 4, although the efficiency at a low frequency, i.e., at a long wavelength, is substantially the same as that in this preferred embodiment, the efficiency in a high-frequency region exceeding about 150 MHz decreases to one-tenth or less the efficiency as large as this preferred embodiment. The reason for this is estimated as follows. Since the shape of the magnetic gap of the conventional magnetic head shown in FIG. 20 is discontinuous, the magnetic path is rapidly bent, so that the magnetization in the magnetic substance portions 2a and 2b must be rapidly bend. As a result, the high-frequency response deteriorates similar to the magnetization changing state of the atomic magnetization in a so-called "magnetic domain wall". It is guessed that this phenomenon occurs when the length of the magnetic path approaches the thickness (about 10 to 100 nm) of the magnetic domain wall of the magnetic substance portion. In other words, when the length of the magnetic path is decreased to about hundreds nm in order to the efficiency, the effects of the decrease of the length of the magnetic path can not be obtained unless the magnetic gap is designed so that the magnetic pass is bent as gently as possible, i.e., so that the length of the magnetic gap continuously varies.

The magnetic head in this preferred embodiment is constructed so that the shape of the magnetic gap 4 is continuously gently bent, so that it is possible to obtain a better high-frequency response than that in the conventional case (see FIG. 4). For that reason, even in the case of shorter wavelength signals, it is possible to reproduce and record with high resolutions and high efficiencies.

Figure 5:
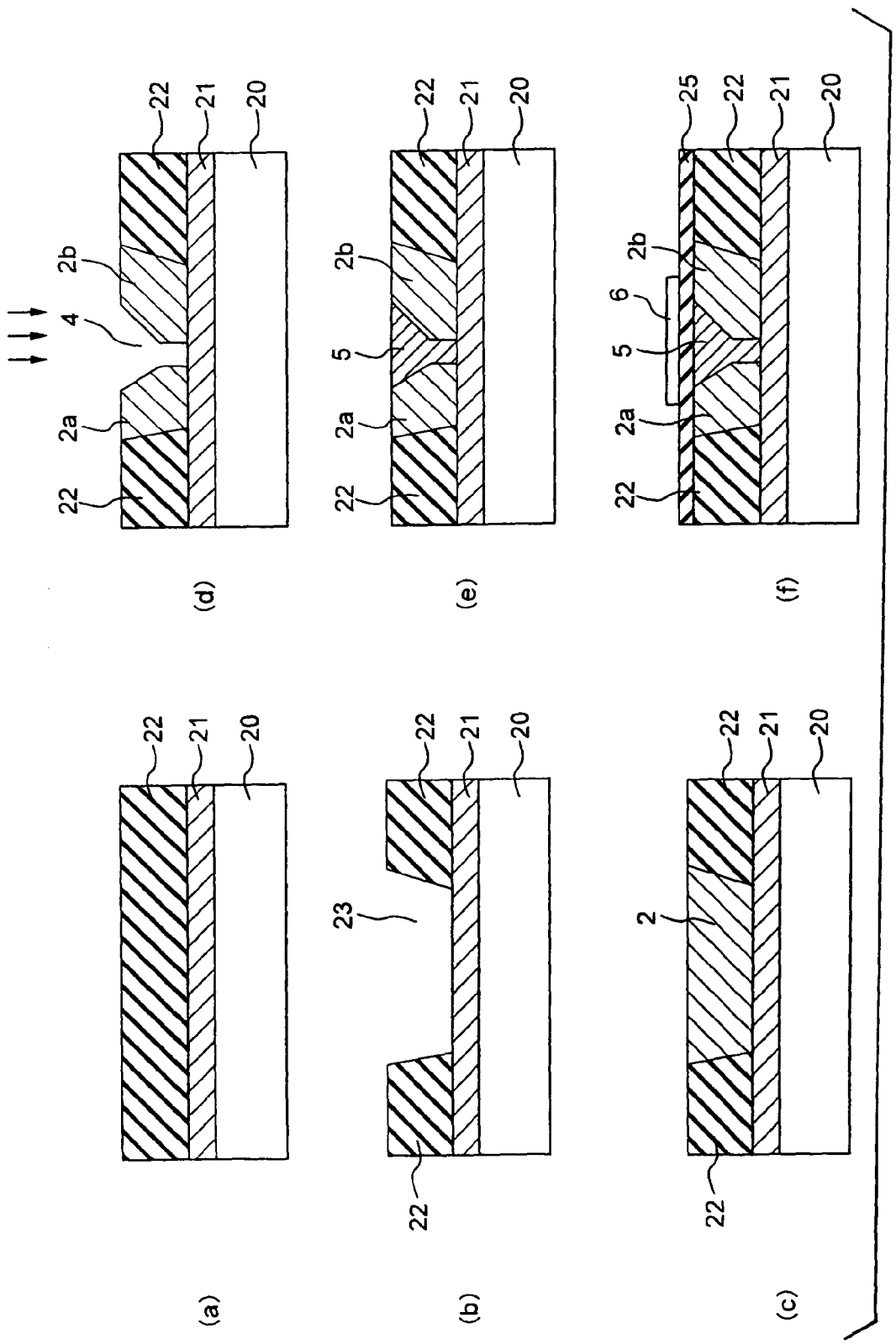
FIGS. 5(a) through 5(f) are sectional views showing steps of producing the magnetic head in the first preferred embodiment.

Referring to FIG. 5, a method for producing the magnetic head in this preferred embodiment will be described below.

First, as shown in FIG. 5(a), after a metal film 21 of, e.g., Cu, is formed on a substrate 20, an insulating film 22 of, e.g., diamond-like-carbon (DLC), is formed on the metal film 21. Subsequently, as shown in FIG. 5(b), a trench 23 communicated with the metal film 21 is formed in the insulating film 22 by the lithography technique.

Then, as shown in FIG. 5(c), a magnetically soft substance 2 of, e.g., FeCo or NiFe, is filled in the trench 23 using the collimation sputtering method or the plating method.

Subsequently, as shown in FIG. 5(d), the magnetically soft substance 2 is irradiated with, e.g., focused ion beams (which will be also hereinafter referred to as FIB), in a direction perpendicular to a medium facing surface of a magnetic head, which is to be formed, from the opposite surface to the medium facing surface, i.e., from the top in FIG. 5(d), to form a magnetic gap 4 and a pair of magnetic substance portions 2a and 2b. Although the length G1 (see FIG. 1) of the magnetic gap 4 on the side of the medium facing surface is determined by the scan precision of the ion beams, it can be formed with sufficient precision. The spread of the magnetic gap 4 on the opposite side to the medium facing surface can be precisely formed by controlling the distribution of the beam intensity. That is, if it is intended to obtain a relatively rapidly widen shape, beams having a relatively wide distribution have only to be used.

By thus irradiating with FIBs in a direction perpendicular to the medium facing surface of the magnetic head, which is to be formed, from the opposite surface to the medium facing surface, it is possible to obtain the magnetic gap 4 having a desired shape.

Figure 6:
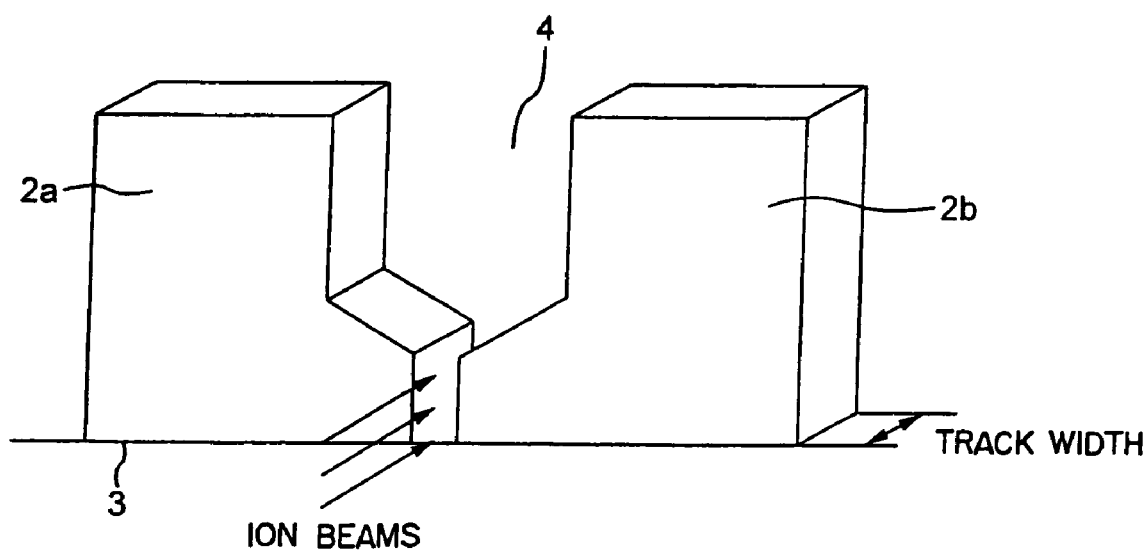
FIG. 6 is a schematic diagram for explaining a conventional producing method.

As shown in FIG. 6, a conventionally known gap working using FIBs is designed to irradiate the magnetic substance portions 2a and 2b with ion beams in the track width direction perpendicular to the medium facing surface 3. In this case, since the beam intensity of FIBs has a Gaussian distribution, the length of the worked gap 4 on the medium facing surface 3 varies in the track width direction, so that it is not possible to obtain a precise line resolution.

However, according to the present invention, it is possible to obtain the magnetic gap 4 having a desired shape. Furthermore, the inventors have first made the irradiation with FIBs in a direction perpendicular to the medium facing surface of a magnetic head, which is to be formed, from the opposite surface to the medium facing surface as the present invention.

Referring to FIG. 5(f) again, the magnetic gap is filled with a metal of, e.g., Cu, W or Pt, using, e.g., the electroplating method to form a recording coil 5 (see FIG. 5(e)).

Subsequently, as shown in FIG. 5(f), after an insulating film 25 is formed so as to cover the magnetic substance portions 2a and 2b and the recording coil 5, a magnetoresistance effect element 6 is formed on the insulating film 25 so as to straddle the recording coil 5 above the pair of magnetic substance portions 2a and 2b. Furthermore, the magnetoresistance effect element may be a giant magnetoresistance effect element or a tunneling magnetoresistance effect element.

Then, the substrate 20 on which the magnetoresistance effect element has been formed is immersed in a weak alkali or weak acid solution to etch and remove the Cu layer 21 to peel off the substrate 20, so that a magnetic head element is completed. Furthermore, if the substrate 20 is immersed in a weak alkali or weal acid solution after a scribing machine or the like is used for making a cut, which reaches the Cu layer 21, into each of magnetic head elements from the top face of the insulating film 25, the Cu layer 21 can be etched and removed from the substrate 20 for a short time, and damage to the head element can be decreased.

Generally in the use of FIB, there is a problem on mass productivity due to the lowering of throughput when a worked volume (worked area x worked depth) is large. However, there is no problem on mass productivity when the worked volume is extremely small as this preferred embodiment.

Thus, the magnetic head in this preferred embodiment is formed by hollowing out the integrated magnetically soft substance, forming the pair of magnetic substance portions 2a and 2b for forming a magnetic path, and embedding the recording coil in the hollowed portion. Therefore, the magnetic path can be formed so as to be smooth, and many medium magnetic fluxes 12 can be led to the magnetoresistance effect element 6 as shown in FIG. 1.

In place of FIB, electron beams may be used for forming the magnetic gap 4, or a slit-like resist mask may be used for forming the magnetic gap with usual ion beams or reactive gas ions. In such cases, the shape of the magnetic gap can be controlled by changing the incidence angle of beams and/or the kind of gas.

Figure 7:
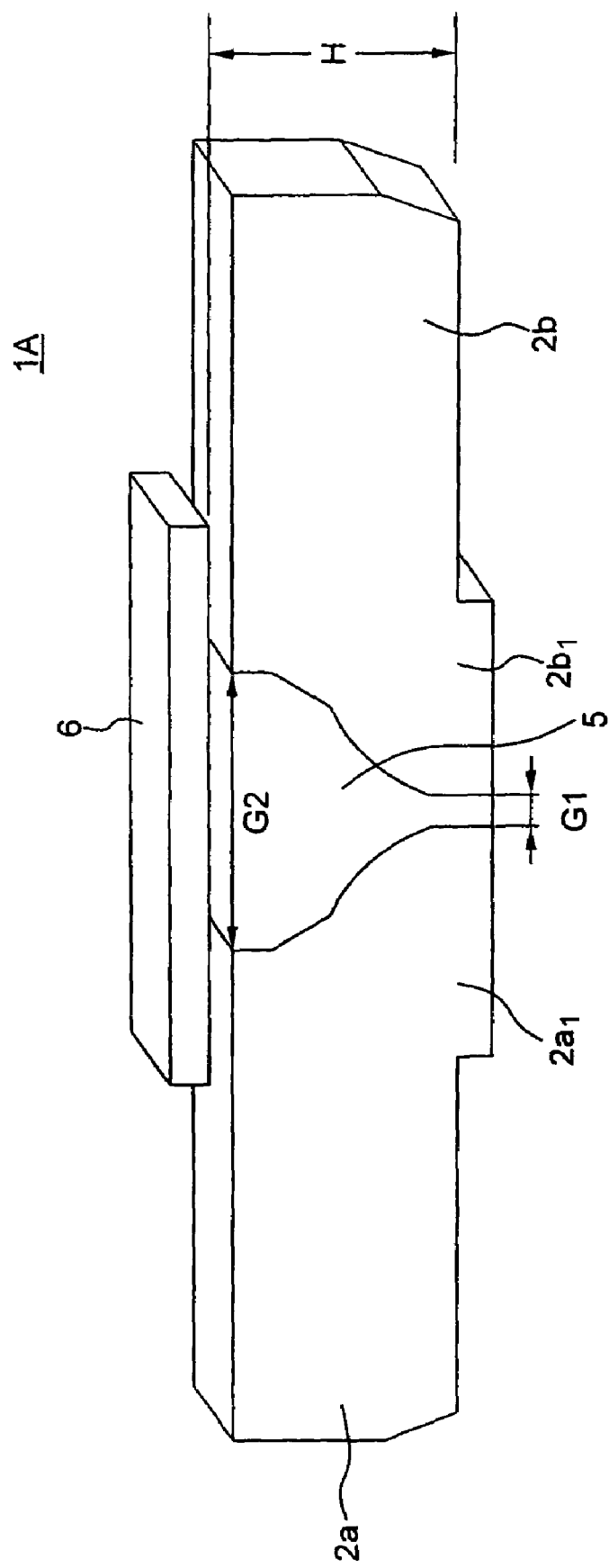
FIG. 7 is a schematic diagram showing the construction of a modified example of the first preferred embodiment.

The construction of a modified example of the magnetic head 1 in this preferred embodiment is shown in FIG. 7. In this example, a magnetic head 1A is provided with protruding portions $2a_1$ and $2b_1$ of magnetically soft substances on the medium facing surface of the pair of magnetic substance portions 2a and 2b in the magnetic head 1 shown in FIG. 1. With this construction, only magnetic fluxes in the vicinity of the gap 4 can be led to the magnetoresistance effect element, so that it is possible to reduce noises in line directions.

SECOND PREFERRED EMBODIMENT

Figure 8:
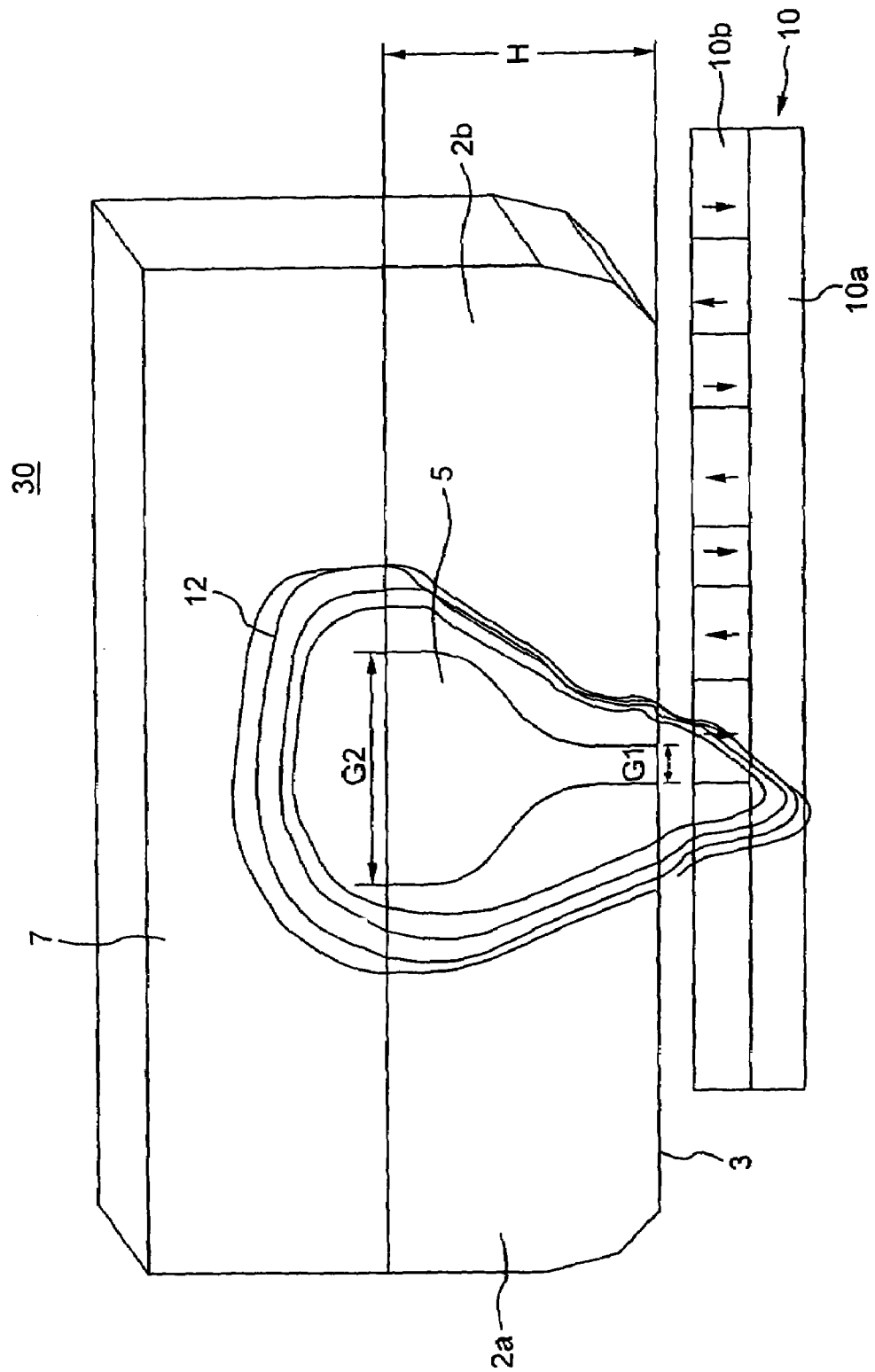
FIG. 8 is a schematic diagram showing the construction of the second preferred embodiment of a magnetic head according to the present invention.

The construction of the second preferred embodiment of a magnetic head according to the present invention is shown in FIG. 8. In this preferred embodiment, a magnetic head 30 is a recording head, and is provided with a magnetic substance portion 7 directly on a pair of magnetic substance portions 2a and 2b and a recording coil 5 so as to straddle the recording coil 5 in place of the magnetoresistance effect element 6 of the magnetic head 1 in the first preferred embodiment shown in FIG. 1.

In this preferred embodiment, since the magnetic substance portion 7 is provided in place of the magnetoresistance effect element 6, it is possible to form a more smooth magnetic path than that in the first preferred embodiment, and it is possible to further improve the efficiency in a recording operation with a shorter wavelength, so that it is possible to carry out a high-density recording operation.

Figure 9:
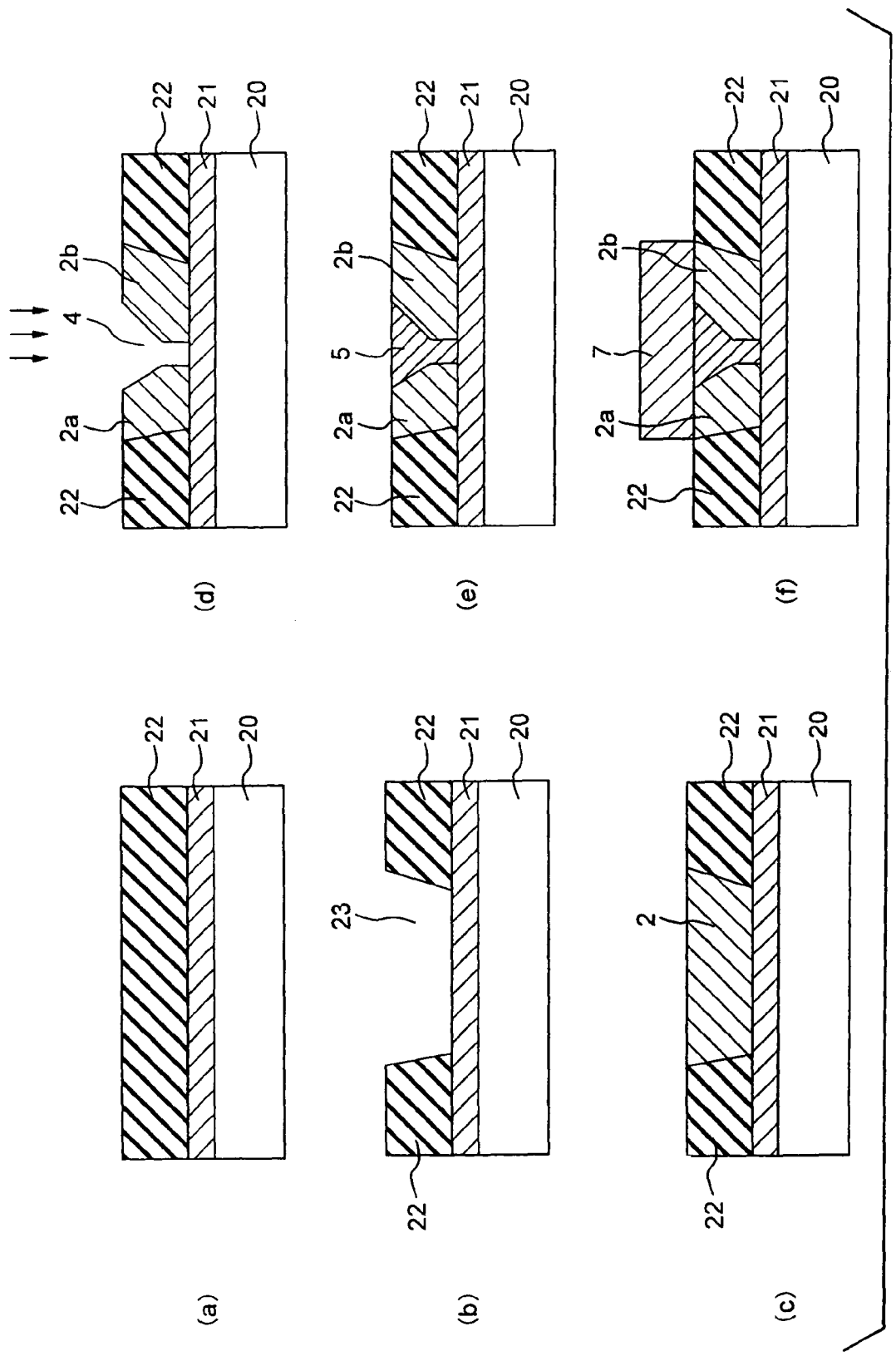
FIGS. 9(a) through 9(f) are sectional views showing steps of producing the magnetic head in the second preferred embodiment.

Referring to FIG. 9, a method for producing the magnetic head 30 in this preferred embodiment will be described below.

Until a magnetic gap 4 is formed to embed a recording coil 5 therein, i.e., until FIG. 5(e), the same steps as those in the method for producing the magnetic head 1 in the first preferred embodiment are carried out (see FIGS. 9(a) through 9(e)). After the recording coil 5 is embedded, a magnetic substance 7 is formed directly on a pair of magnetic substance portions 2a and 2b and the recording coil 5 so as to straddle the magnetic substance portions 2a and 2b.

Thereafter, a substrate 20 and a Cu layer 21 are peeled off to complete a magnetic head element similar to the method for producing the magnetic head in the first preferred embodiment.

Figure 10:
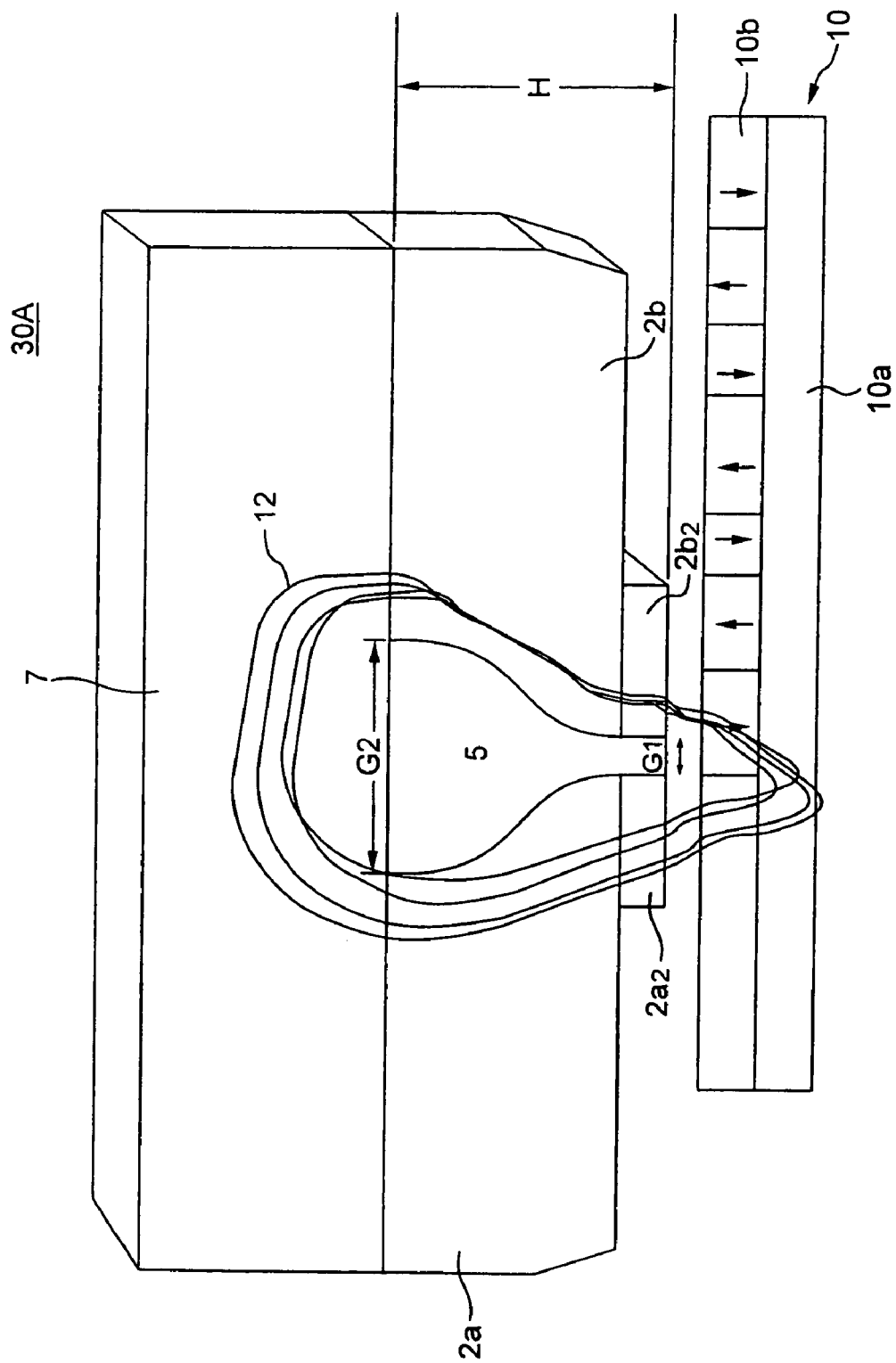
FIG. 10 is a schematic diagram showing the construction of a modified example of the second preferred embodiment.

The construction of a modified example of the magnetic head 30 in the second preferred embodiment is shown in FIG. 10. In this modified example, a magnetic head 30A is provided with protruding portions $2a_2$ and $2b_2$ of magnetic substances in the vicinity of the magnetic gap on the medium facing surface 3 of the pair of magnetic substance portions 2a and 2b in the magnetic head 30 in the second preferred embodiment. With this construction, magnetic fluxes can be focused in the vicinity of the magnetic gap, so that the magnetic field 12 in line directions can be rapidly inclined to decrease the magnetization transition width of the medium. For that reason, it is possible to carry out a higher-density recording operation than the magnetic disk in the second preferred embodiment.

THIRD PREFERRED EMBODIMENT

Figure 11:
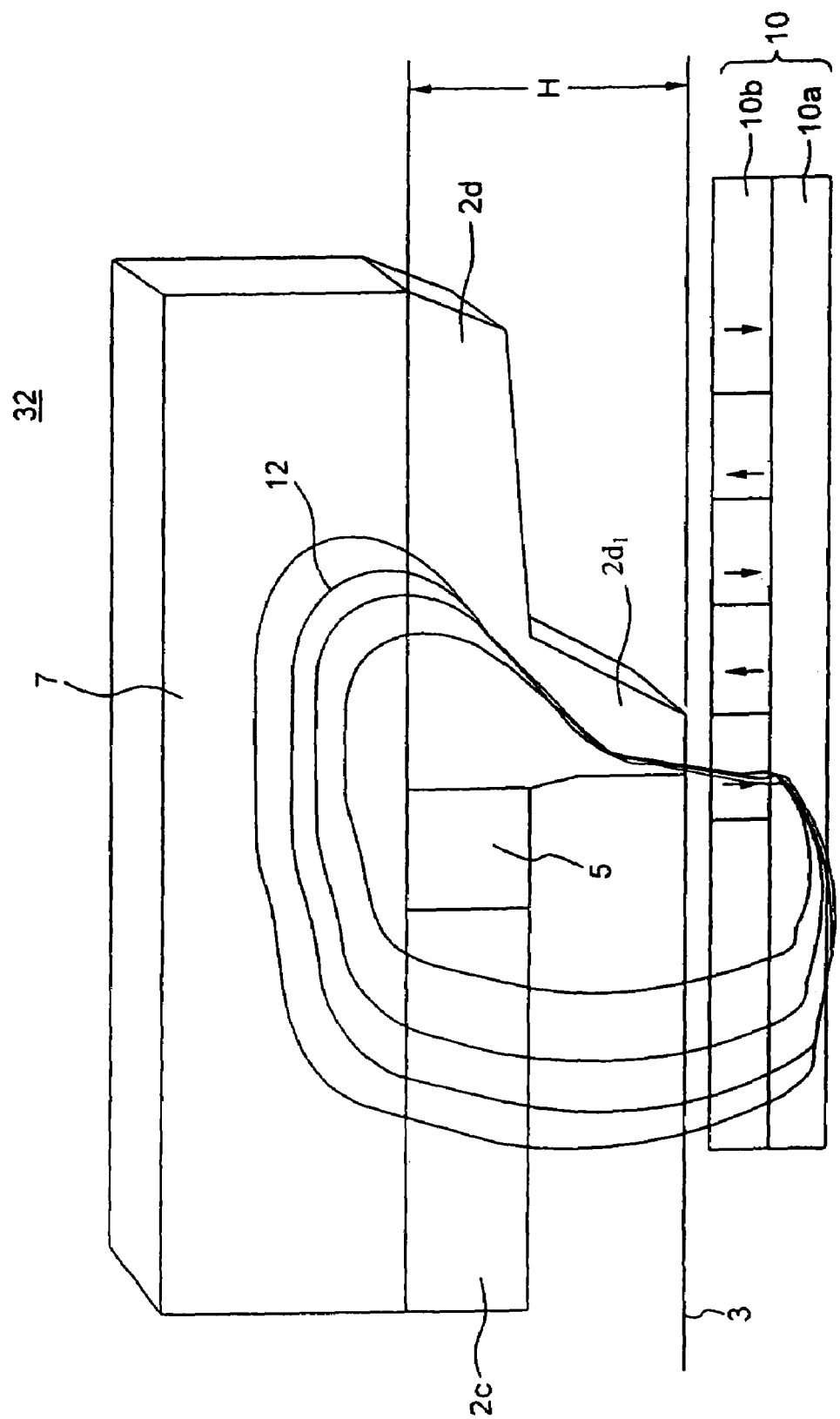
FIG. 11 is a schematic diagram showing the third preferred embodiment of a magnetic head according to the present invention.

The construction of the third preferred embodiment of a magnetic head according to the present invention is sown in FIG. 11. In this third preferred embodiment, a magnetic head 32 is a recording magnetic head, and comprises a pair of magnetic substance portions 2c and 2d of magnetically soft substances, a recording coil 5 and a magnetic substance 7.

A magnetic gap is provided between the magnetic substance portions 2c and 2d, and the recording coil 5 is provided so as to be filled in the magnetic gap. Furthermore, the length of the magnetic gap may be constant unlike the first and second preferred embodiments. The magnetic substance portion 2d is a main pole serving to record information on a recording medium 10, and has a protruding portion $2d_1$ having a shape converging toward a medium facing surface. The protruding portion $2d_1$ also has a shape converging toward the medium facing surface 3 from the side of the recording coil 5. The magnetic substance 7 is formed directly on the opposite surface to the medium facing surface of the magnetic substance portions 2c and 2d so as to straddle the magnetic substance portions 2c and 2d.

Figure 12:
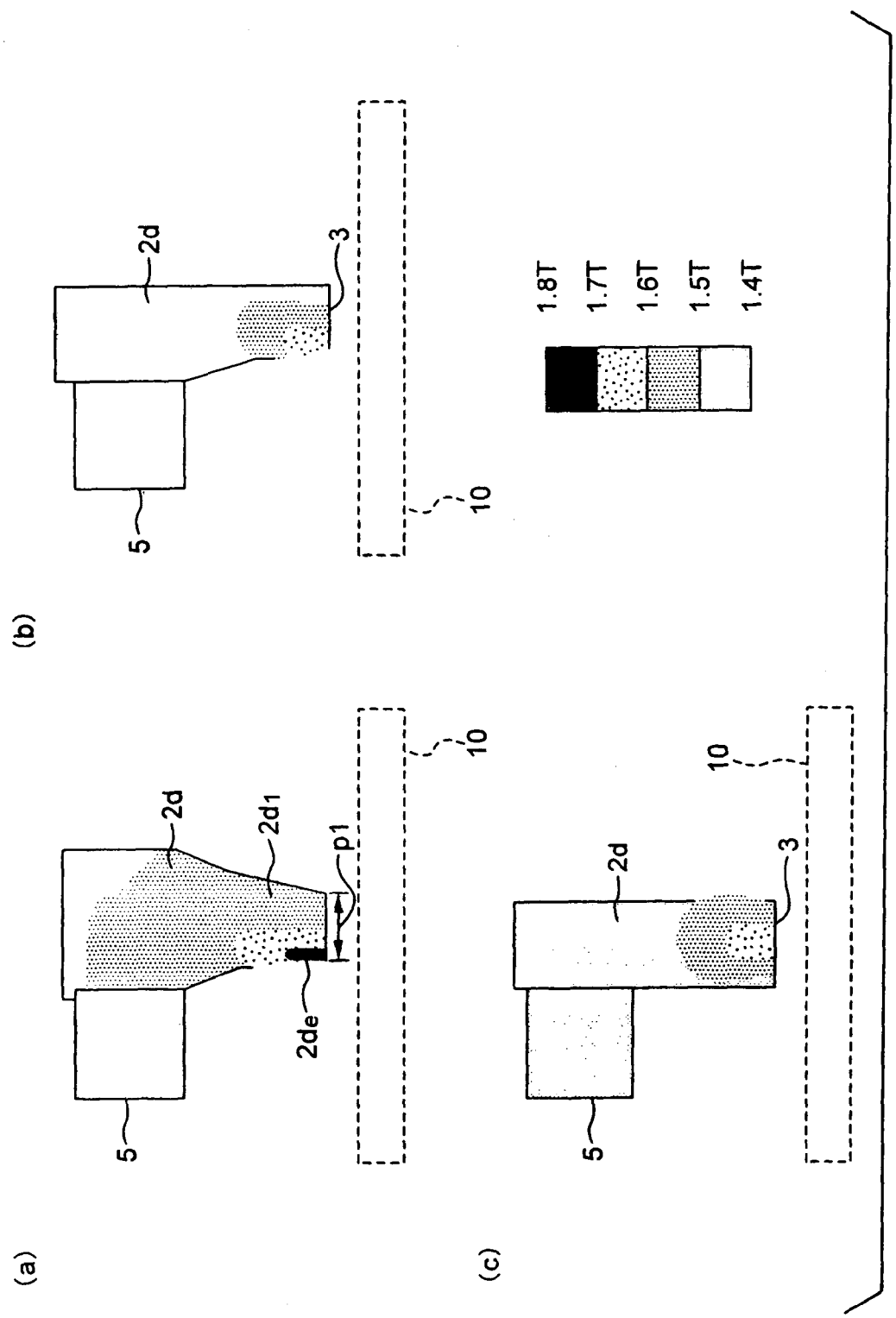
FIGS. 12(a) through 12(c) are schematic diagrams for explaining advantages in the third preferred embodiment.

As described above, in the magnetic head 32 in this preferred embodiment, the protruding portion $2d_1$ of the magnetic substance portion 2d serving as the main pole converges toward the medium facing surface 3, and particularly, the protruding portion $2d_1$ also converges toward the medium facing surface 3 from the side of the recording coil 5. For that reason, as shown in FIG. 12(a), it is possible to realize a high magnetic flux density at a trailing edge of the magnetic pole 2d, which is provided for recording information on the recording medium 10, on the side of the recording coil, and the gradient of the magnetic field 12 in line directions can be rapid as shown in FIG. 11, so that it is possible to carry out a high-density recording operation. If the height H from the medium facing surface 3 of the magnetic substance portion 2d to the interface between the magnetic substance portion 7 and the magnetic substance portion 2d is small similar to the first or second preferred embodiment, it is possible to improve the recording efficiency, and it is possible to obtain a high recording efficiency even in the case of a shorter wavelength signal.

When only a portion of the magnetic substance portion 2d serving as the main pole on the side of the recording coil 5 converges toward the medium facing surface 3 as shown in FIG. 12(b), or when the magnetic substance portion 2d does not converge toward the medium facing surface 3 as shown in FIG. 12(c), the magnetic flux density on the trailing edge is small, and the gradient of the magnetic field 13 in line directions is gentle. For that reason, it is not possible to carry out a higher-density recording operation than this preferred embodiment.

As will be described later, if the length p1 (see FIG. 12(a)) of the main pole 2d is also decreased, it is possible to achieve a high-density of magnetic fluxes, i.e., it is possible to carry out a high-density recording operation.

Figure 13:
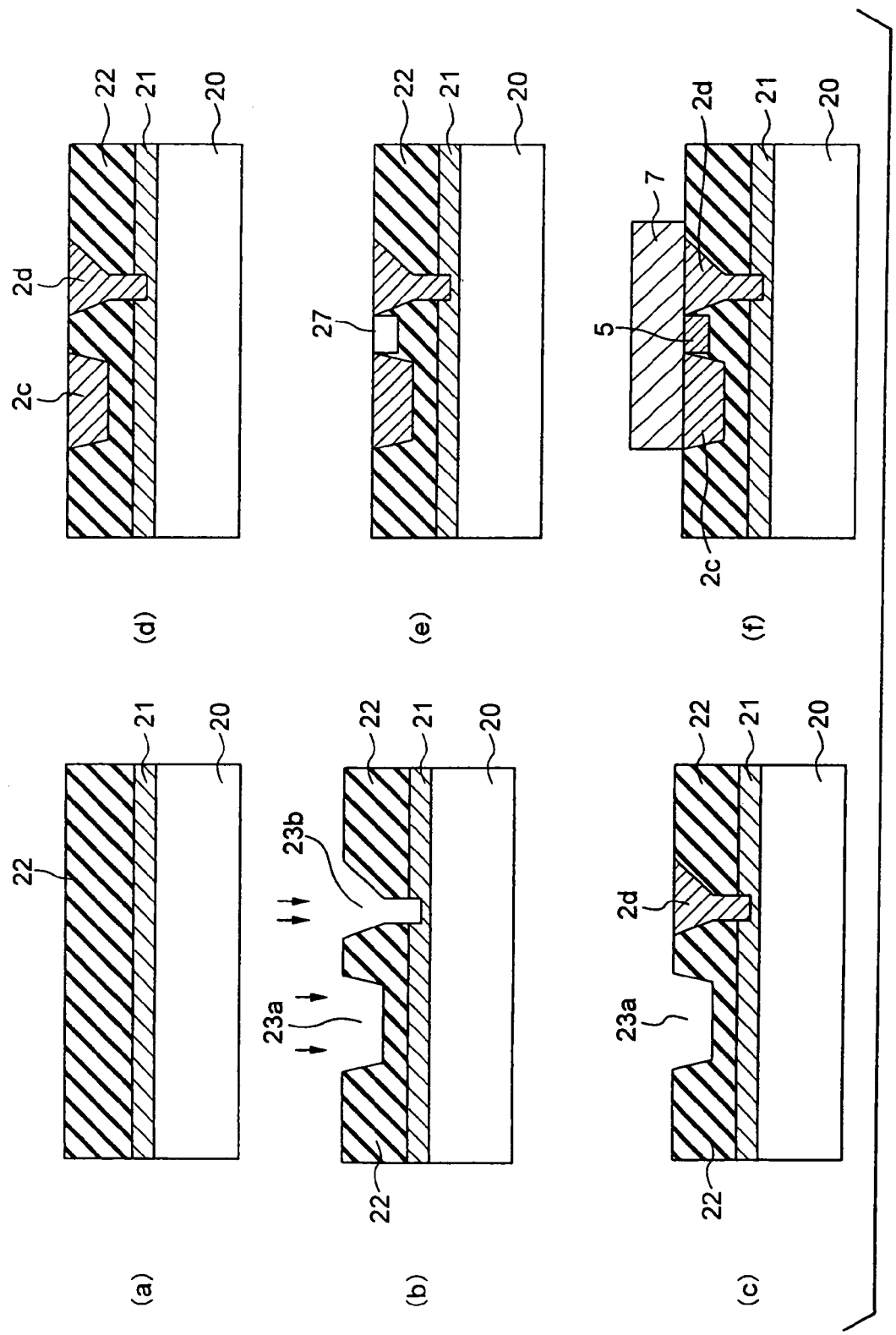
FIGS. 13(a) through 13(f) are sectional views showing steps of producing the magnetic head in the third preferred embodiment.

Referring to FIG. 13, a method for producing a magnetic head in this preferred embodiment will be described below.

First, as shown in FIG. 13(a), after a metal film 21 of, e.g., Cu, is formed on a substrate 20, an insulating film 22 of, e.g., DLC, is formed on the metal film 21.

Subsequently, as shown in FIG. 13(b), using, e.g., FIBs, a trench 23a is formed in the insulating film 22, and a trench 23b reaching the Cu film 21 is formed.

Then, as shown in FIG. 13(c), a magnetic substance of, e.g., FeCo or NiFe, is embedded in the trench 23b using, e.g., the collimation sputtering method or the plating method, to form a magnetic substance portion 2d.

Subsequently, similar to the formation of the magnetic substance portion 2d, a magnetic substance is embedded in the trench 23a to form a magnetic substance portion 2c (see FIG. 13(d)).

Then, as shown in FIG. 13(e), a trench 27 for forming a recording coil is formed in the insulating film 22 between the magneticsubstance portions 2c and 2d, and this trench 27 is filled with Cu using, e.g., the electroplating method, to form a recording coil 5.

Then, as shown in FIG. 13(f), a magnetic substance 7 is formed on the magnetic substance portions 2c and 2d and the recording coil 5 so as to construct a bridge between the magnetic substance portions 2c and 2d.

Thereafter, in the same manner as the magnetic head producing method in the first preferred embodiment, the substrate 20 and the Cu layer 21 are peeled off to complete a magnetic head element.

In this producing method, since the magnetic substance portion 2d is formed by filling the magnetically soft material in the trench which is formed by the dry etching, such as FIBs, from the opposite side to the medium facing surface 3, the length p1 of the main pole on the side of the medium facing surface 3 can not only be repeatably and precisely formed, but the magnetic substance portion 2d can also ideally converse toward the medium facing surface 3 as described above. In a usual recording medium system, information is accessed by moving a head by means of a rotary actuator. Therefore, in the positional relationship between the inner-peripheral-side track of the recording medium and the outer-peripheral-side track, the main pole is inclined with respect to the peripheral directions of the disk. In the case of a main pole type recording head, a recording operation is also carried out from the side of the main pole, so that it was revealed that there is a problem in that noises increase on the track edge of the medium. If the recording from the side of the main pole is decreased, noises decrease. In order to achieve this, it is required to decrease the length p1 of the main pole as small as possible. However, if the length p1 of the main pole is decreased, the recording efficiency is greatly lowered, so that it is not conventionally possible to provide a heat having a practical efficiency. In this preferred embodiment, the shape of the main pole also converges from the side of the recording coil 5, so that it is possible to ensure a practical magnetic flux density even if the length p1 of the main pole is decreased. This is an advantage due to the above described producing method, i.e., due to the dry etching from the opposite side to the medium facing surface. In particular, if FIBs are used, it is possible to easily control the shape, and it is possible to easily form a main pole which is smaller than the resolution in the photolithography.

If the recording coil 5 is not formed in the magnetic head 1 in the first preferred embodiment shown in FIG. 1 or in the magnetic head 1A shown in FIG. 7, it is possible to obtain an efficient magnetic head 1B for reproduction use only.

Figure 14:
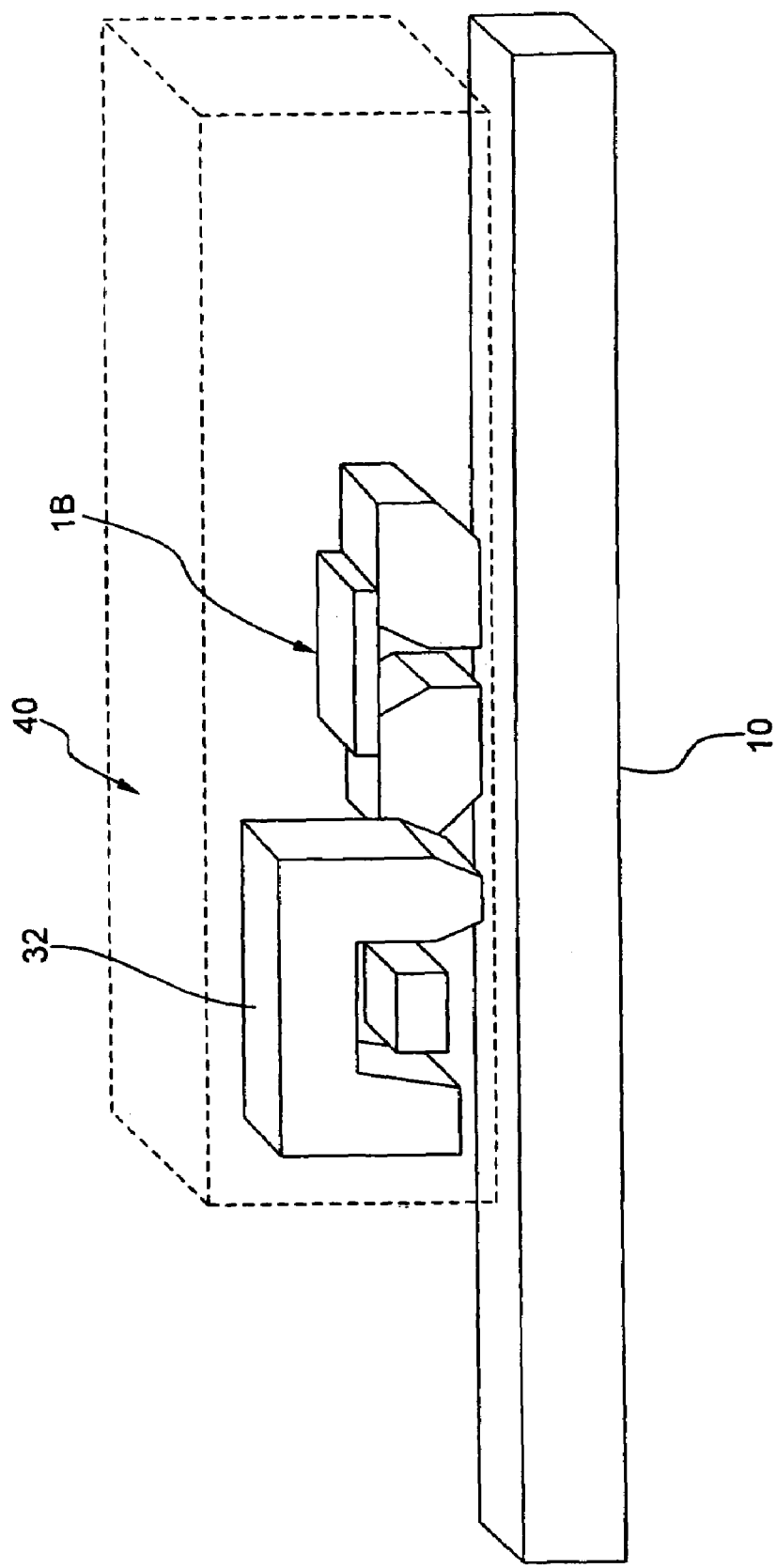
FIG. 14 is a schematic diagram showing a recording/reproducing integral head according to the present invention.
Figure 15:
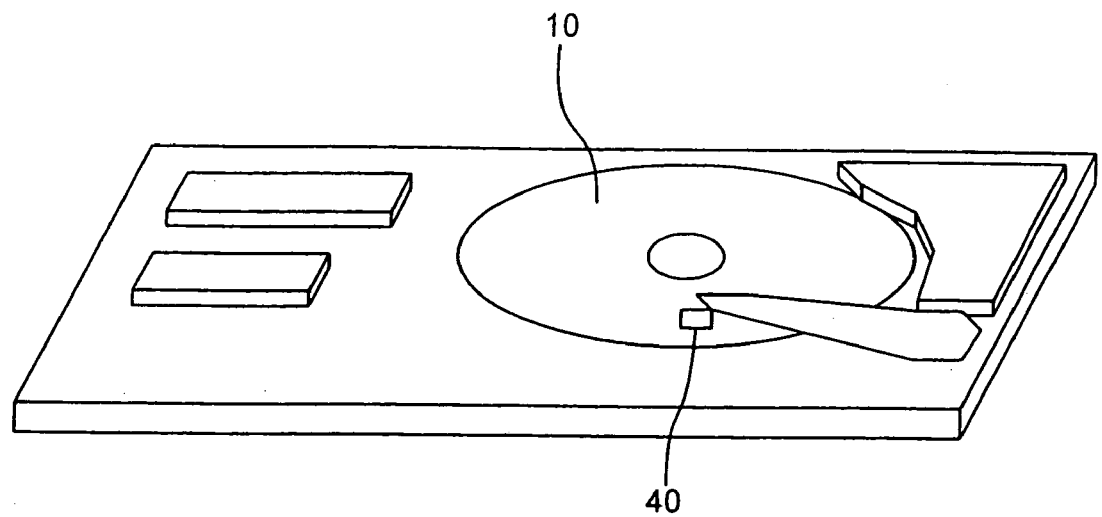
FIG. 15 is a schematic diagram showing a recording and/or reproducing system having a magnetic head according to the present invention.

Therefore, as shown in FIG. 14, if a recording/reproducing head 40 which is formed by integrating the magnetic head 1B for reproduction use only, with the magnetic head for recording use only shown in FIG. 8, 10 or 11, e.g., the magnetic head 32, is used, it is possible to obtain a high-density recording and/or reproducing system shown in, e.g., FIG. 15.

In particular, according to the present invention, since it is possible to carry out recording and reproducing operations at a shorter wavelength, it is possible to achieve a transfer speed which could not be achieved until now, so that it is possible to rapidly exchange information via networks.

Figure 16:
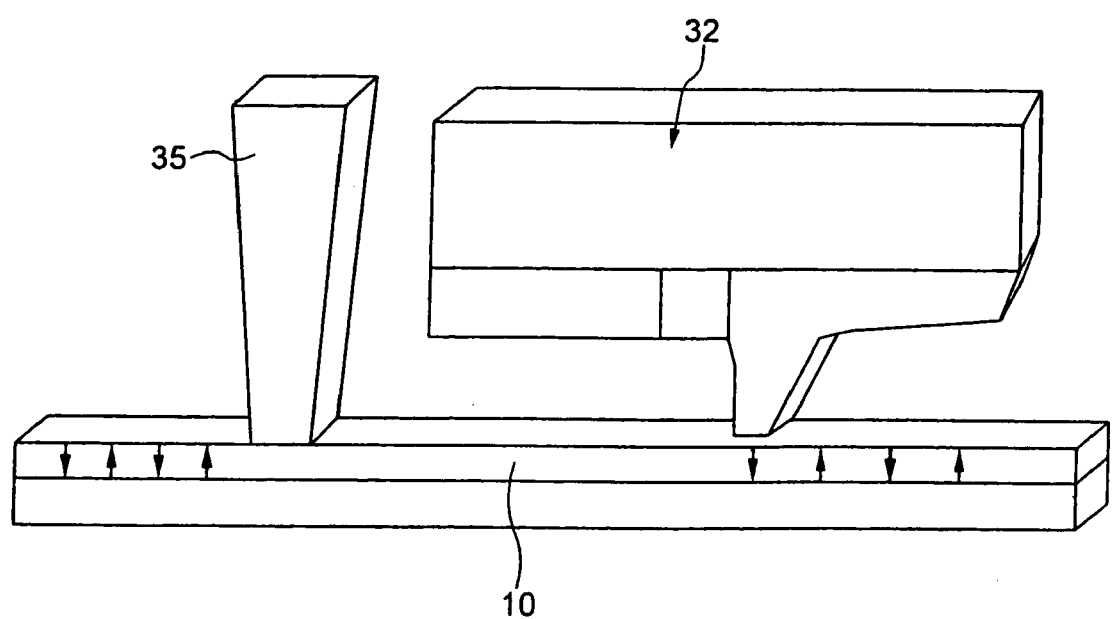
FIG. 16 is a schematic diagram for explaining a photo-assisted magnetic recording operation using a magnetic head according to the present invention.
Figure 17:
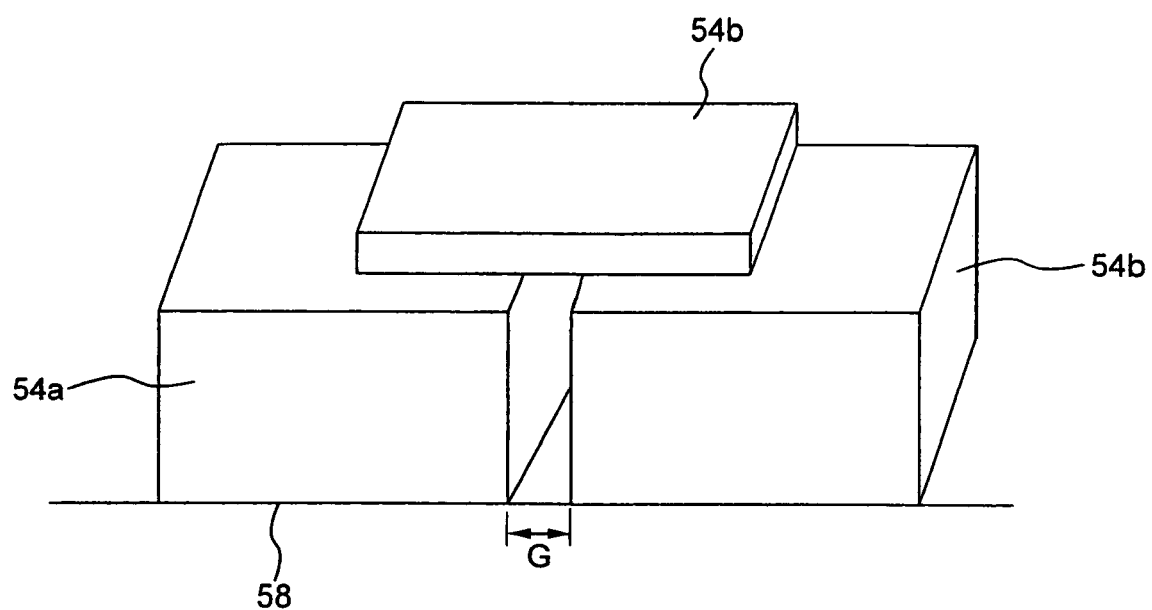
FIG. 17 is a schematic diagram showing the construction of a magnetic head.
Figure 18A:
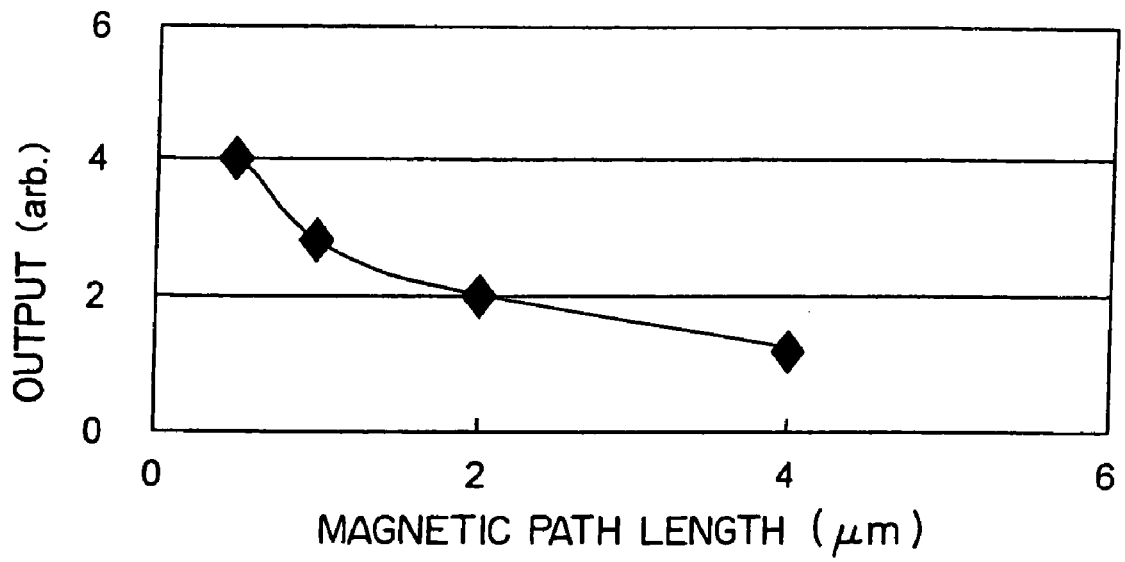
FIG. 18A is a graph showing the relationship between magnetic path lengths and outputs.
Figure 18B:
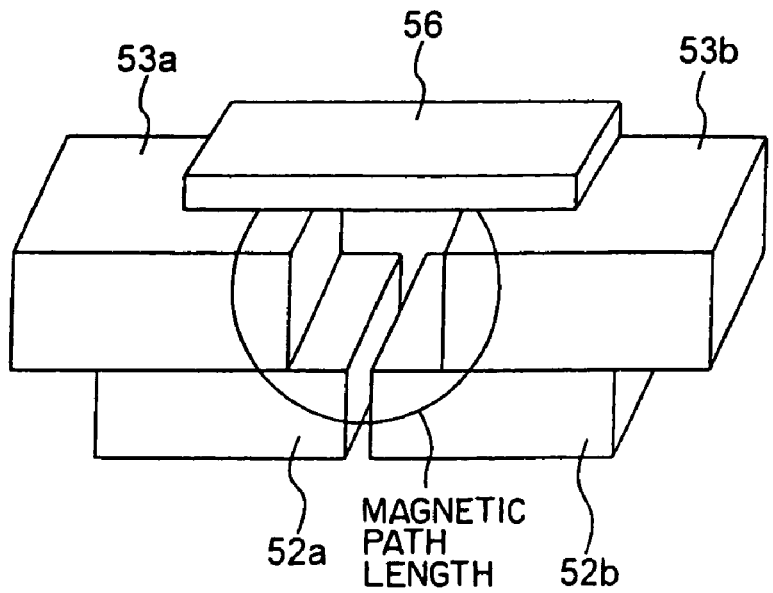
FIG. 18B is a schematic diagram for explaining a magnetic path length.
Figure 19:
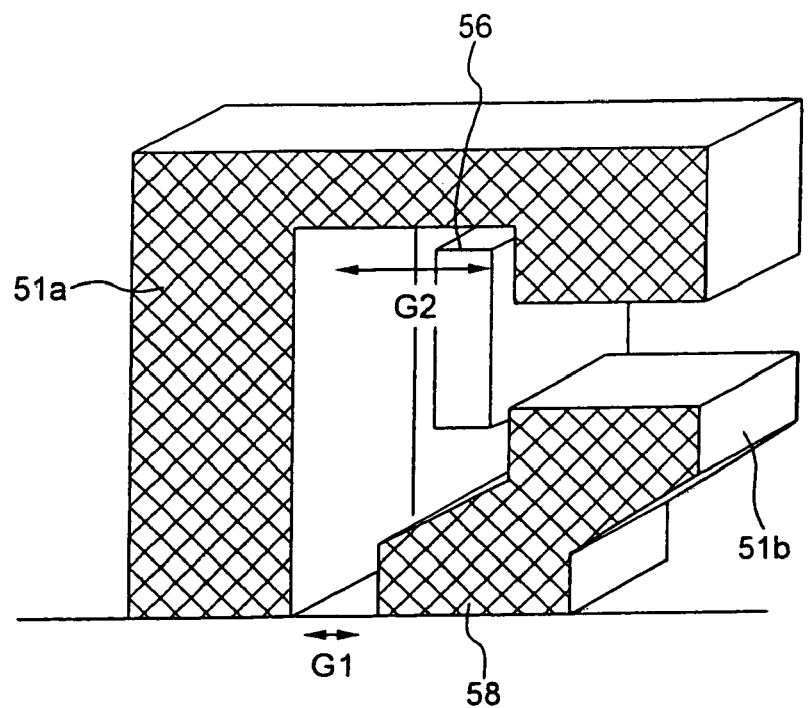
FIG. 19 is a schematic diagram showing the construction of a conventional magnetic head.

Moreover, even if a magnetic head according to the present invention, e.g., the magnetic head 32, is used for carrying out a thermo-assisted magnetic recording or photo-assisted magnetic recording operation which are assisted by light or heat, it is possible to achieve a high-density recording, and it is possible to achieve a high transfer speed. Furthermore, FIG. 16 shows a photo-assisted magnetic recording system for assisting a recording operation with laser beams 35.

FOURTH PREFERRED EMBODIMENT

Figure 22:
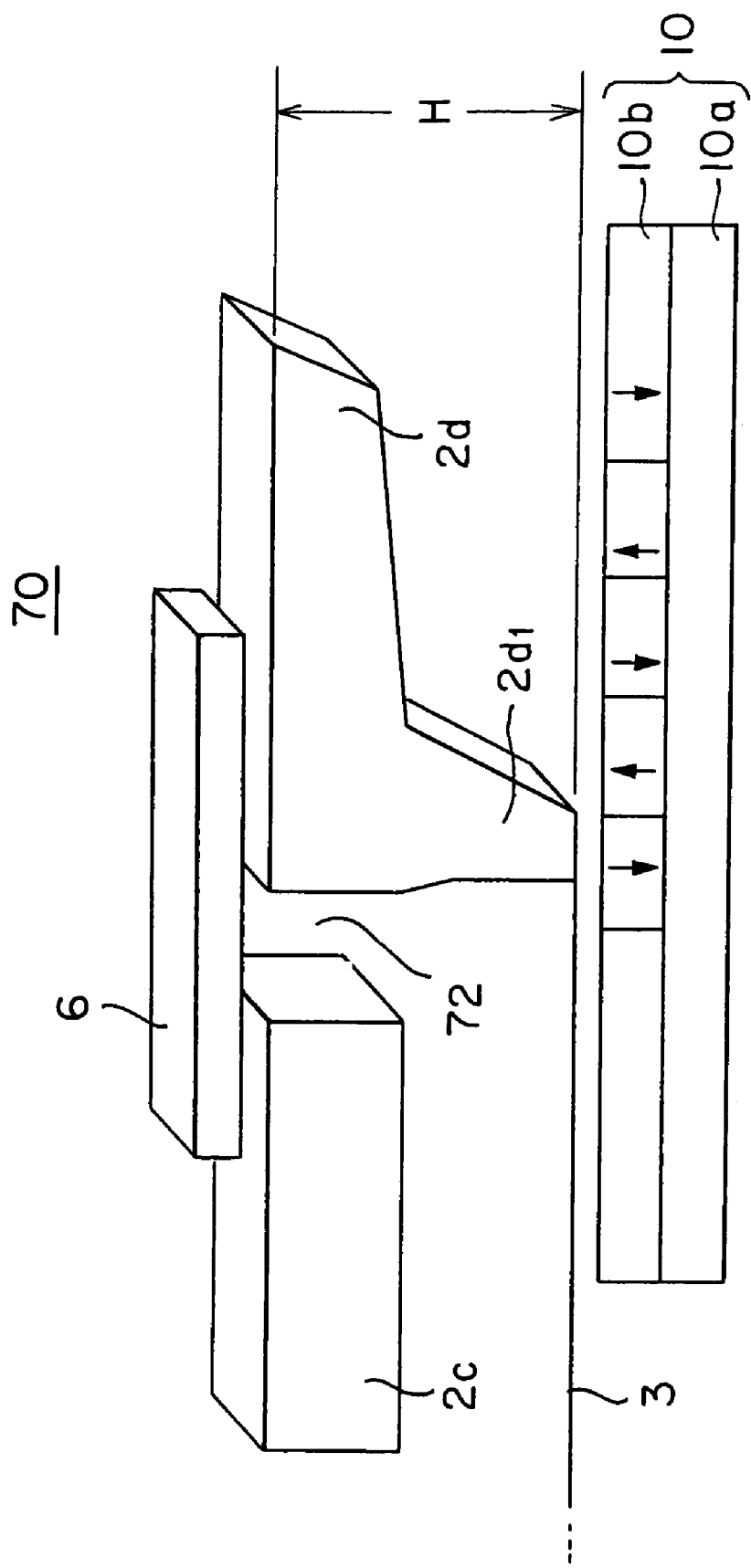
FIG. 22 is a schematic diagram showing the construction of the third preferred embodiment of a magnetic head according to the present invention.

The construction of the fourth preferred embodiment of a magnetic head according to the present invention is shown in FIG. 22. In this fourth preferred embodiment, a magnetic head 70 comprises a pair of magnetic substance portions 2c and 2d of magnetically soft substances, and a magnetoresistance effect element 6. A magnetic gap 72 is provided between the magnetic substance portions 2c and 2d. The magnetoresistance effect element 6 is provided on the opposite surface to a medium facing surface 3 of the magnetic substance portions 2c and 2d so as to straddle the magnetic gap 72. The shape of the magnetic gap 72 may be the same shape as or different from that in the first or second preferred embodiment. For example, the length of the magnetic gap 72 may be constant. The magnetic substance portion 2d is a main pole serving to read information out of a recording medium 10, and has a protruding portion 2d1 of a magnetically soft substance having a shape converging toward the medium facing surface 3. This protruding portion 2d1 also has a shape converging toward the medium facing surface 3 from the magnetic gap 72.

As described above, in the magnetic head 70 in this preferred embodiment, the protruding portion 2d1 of the magnetic substance portion 2d serving as the main pole has a shape converging toward the medium facing surface 3. In particular, the protruding portion 2d1 also has a shape converging toward the medium facing surface 3 from the magnetic gap 72. Therefore, since the area of the main pole 2d for reading information out of the recording medium 10 can be small on the side of the medium facing surface, the reproducing resolution is improved. In addition, since the protruding portion 2d1 diverges toward the magnetoresistance effect element 6 from the medium facing surface, it is possible to efficiently lead medium magnetic fluxes to the magnetoresistance effect element 6.

Furthermore, if the height H from the medium facing surface 3 to the opposite surface to the medium facing surface 3 is small similar to the first through third preferred embodiments, the length of the magnetic path is small, so that it is possible to improve the reproducing efficiency and to obtain a high reproducing efficiency even in the case of a shorter wavelength signal.

FIFTH PREFERRED EMBODIMENT

Figure 23:
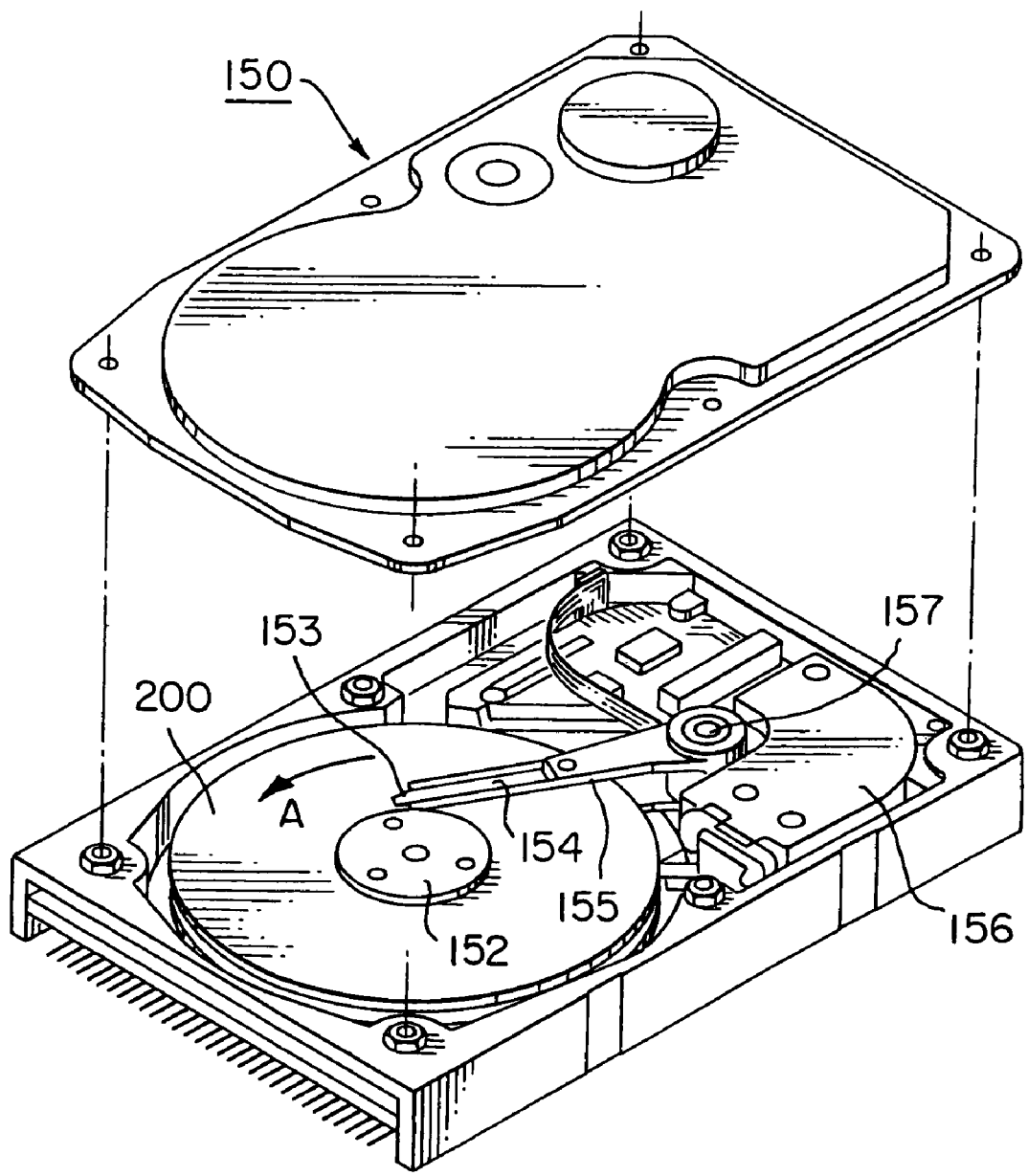
FIG. 23 is a perspective view showing the schematic construction of a principal part of a magnetic recording and/or reproducing system according to the present invention.
Figure 24:
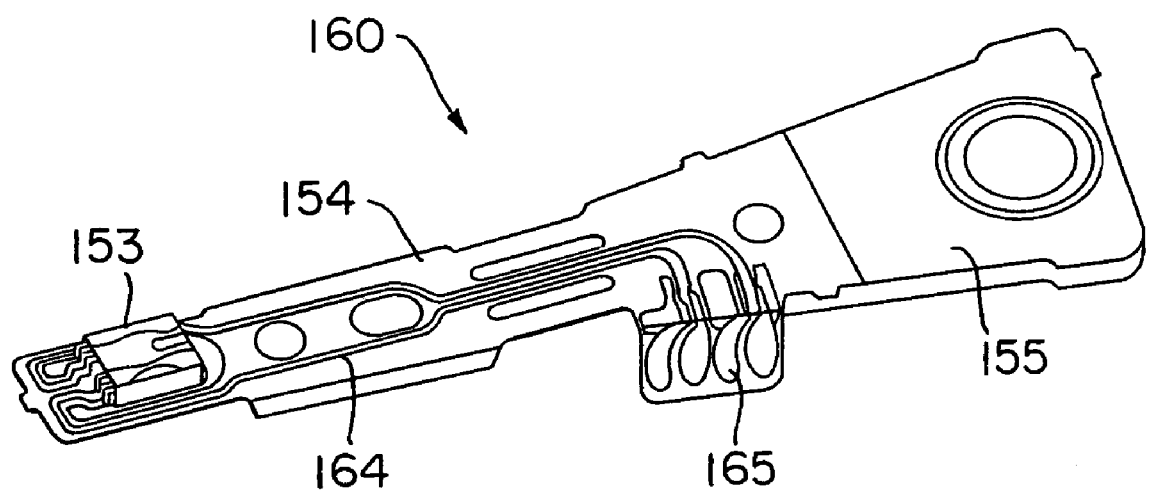
FIG. 24 is an enlarged perspective view of a magnetic head assembly in front of an actuator arm, which is viewed from the side of a disk.

Referring to FIGS. 23 and 24, the fifth preferred embodiment of a magnetic reproducing system according to the present invention will be described below.

The schematic construction of this magnetic reproducing system is shown in FIG. 23. That is, in this preferred embodiment, a magnetic reproducing system 150 a system of a type using a rotary actuator. In FIG. 23, a magnetic disk 200 is loaded on a spindle 152 to be rotated in a direction of arrow A by means of a motor (not shown) in response to a control signal from a drive unit control part (not shown). A head slider 153 for recording and/or reproducing information stored on magnetic disk 200 is mounted on the tip portion of a thin-film-like suspension 154. The magnetic head in the first or fourth preferred embodiment is mounted on the head slider 153 in the vicinity of its tip.

The suspension 154 is connected to one end of an actuator arm 155 having a bobbin portion for holding a driving coil (not shown) and so forth. The other end of the actuator arm 155 is provided with a voice coil motor 156 which is a kind of a linear motor. The voice coil motor 156 comprises a driving coil (not shown) wound onto the bobbin portion of the actuator arm 155, and a magnetic circuit comprising a permanent magnet and facing yoke which are arranged so as to face each other via the coil.

The actuator arm 155 is held by ball bearings (not shown) provided at two places above and below a fixed shaft 157, and is rotatable and slidable by means of the voice coil motor 156.

FIG. 24 is an enlarged perspective view of a magnetic head assembly in front of the actuator arm 155, which is viewed from the side of a disk. That is, the magnetic head assembly 160 has the actuator arm 155 having the bobbin portion for holding the driving coil and so forth, and one end of the actuator arm 155 is connected to the suspension 154.

On the tip portion of the suspension 154, the head slider 153 having the magnetic head in any one of the above described preferred embodiments is mounted.

The suspension 154 has a writing/reading lead wire 164. This lead wire 164 is electrically connected to each of the electrodes of the magnetic head provided in the head slider 153. In FIG. 23, reference number 165 denotes an electrode pad of the magnetic head assembly 160.

A predetermined floating amount is set between the medium facing surface (ABS) of the head slider 153 and the surface of the magnetic disk 200.

While the magnetic reproducing system has been described in this preferred embodiment, the recording head in the second or third preferred embodiment may be substituted for the reproducing head. In this case, it is possible to obtain a magnetic recording system. If the reproducing head and recording head in the above described preferred embodiments are combined with each other, it is possible to obtain a magnetic recording and/or reproducing system.

The medium should not be limited to hard disks, but the medium may be any magnetic recording medium, such as flexible disk and magnetic cards. Moreover, a so-called "removable" type system capable of removing a magnetic recording medium from the system may be used.

As described above, according to the present invention, it is possible to carry out a recording or reproducing operation with a high resolution and a high efficiency even in the case of a shorter magnetic path length and a shorter wavelength signal.

While the present invention has been disclosed in terms of the preferred embodiment in order to facilitate better understanding thereof, it should be appreciated that the invention can be embodied in various ways without departing from the principle of the invention. Therefore, the invention should be understood to include all possible embodiments and modification to the shown embodiments which can be embodied without departing from the principle of the invention as set forth in the appended claims.

What is claimed is:

1. A method for producing a magnetic head, comprising:
   forming a magnetic body on a substrate, the magnetic body comprising a principal plane facing the substrate and a rear plane opposite to the principal plane;
   applying beam to the rear plane of the magnetic body and forming a portion defining a hole extending from the rear plane to the principal plane;
   forming a magnetic gap in the hole; and
   separating the magnetic body and the magnetic gap from the substrate and forming a medium facing surface substantially coplanar with the principal plane.

2. A method for producing a magnetic head as set forth in claim 1, wherein the beam is a focused ion beam.

* * * * *